United States Patent
Park et al.

(10) Patent No.: US 11,101,951 B2
(45) Date of Patent: Aug. 24, 2021

(54) METHOD FOR TRANSMITTING AND RECEIVING DATA IN WIRELESS COMMUNICATION SYSTEM AND APPARATUS THEREFOR

(71) Applicant: LG Electronics Inc., Seoul (KR)

(72) Inventors: Jonghyun Park, Seoul (KR); Jiwon Kang, Seoul (KR); Kijun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 304 days.

(21) Appl. No.: 16/338,036

(22) PCT Filed: Sep. 29, 2017

(86) PCT No.: PCT/KR2017/010941
§ 371 (c)(1),
(2) Date: Dec. 16, 2019

(87) PCT Pub. No.: WO2018/062937
PCT Pub. Date: Apr. 5, 2018

(65) Prior Publication Data
US 2020/0228267 A1 Jul. 16, 2020

Related U.S. Application Data

(60) Provisional application No. 62/401,853, filed on Sep. 29, 2016.

(51) Int. Cl.
*H04W 4/00* (2018.01)
*H04L 5/00* (2006.01)
(Continued)

(52) U.S. Cl.
CPC .......... *H04L 5/0048* (2013.01); *H04B 7/024* (2013.01); *H04B 7/0639* (2013.01);
(Continued)

(58) Field of Classification Search
CPC .... H04B 7/024; H04B 7/0408; H04B 7/0639; H04B 7/0691; H04B 7/0695; H04B 7/088;
(Continued)

(56) References Cited

U.S. PATENT DOCUMENTS

| 2011/0019776 A1 | 1/2011 | Zhang et al. | |
| 2017/0215222 A1* | 7/2017 | Cheng | H04W 72/1278 |
| 2018/0219605 A1* | 8/2018 | Davydov | H04B 7/088 |

FOREIGN PATENT DOCUMENTS

KR 20150101750 9/2015

OTHER PUBLICATIONS

Xinwei, "Considerations on Beam Management for NR", R1-166583, 3GPP TSG RAN WG1 Meeting #86, Gothenburg, Sweden, Aug. 22-26, 2016, 8 pages.
(Continued)

*Primary Examiner* — Minh Trang T Nguyen
(74) *Attorney, Agent, or Firm* — Fish & Richardson P.C.

(57) ABSTRACT

Provided is a method in which a user equipment (UE) receives data in a wireless communication system including receiving downlink control information related to downlink data transmission from at least one base station; determining receiving beams for simultaneously receiving the downlink data transmitted independently through a plurality of layer groups from a plurality of base stations including the at least one base station based on the downlink control information; and simultaneously receiving the downlink data from the plurality of base stations using the determined receiving beams, wherein the downlink control information includes beam index information about the receiving beams, and the beam index information is instructed for each of the plurality of layer groups.

15 Claims, 16 Drawing Sheets

(51) Int. Cl.
H04B 7/024 (2017.01)
H04B 7/06 (2006.01)
H04B 7/08 (2006.01)
H04W 72/04 (2009.01)

(52) U.S. Cl.
CPC .......... H04B 7/0695 (2013.01); H04B 7/088 (2013.01); H04W 72/042 (2013.01)

(58) Field of Classification Search
CPC ... H04L 5/0035; H04L 5/0037; H04L 5/0042; H04L 5/0048; H04L 5/0051; H04L 5/0094; H04W 72/042; H04W 72/046
See application file for complete search history.

(56) References Cited

OTHER PUBLICATIONS

Samsung, "Discussion on TRP beamforming and beam management", R1-166785, 3GPP TSG RAN WG1 #85, Gothenburg, Sweden, Aug. 22-26, 2016, 7 pages.

Nokia, Alcatel-Lucent Shanghai Bell, "On procedures for beam selection and feedback signaling", R1-167287, 3GPP TSG-RAN WG1#86, Gothenburg, Sweden, Aug. 22-26, 2016, 7 pages.

* cited by examiner

METHOD FOR TRANSMITTING AND RECEIVING DATA IN WIRELESS COMMUNICATION SYSTEM AND APPARATUS THEREFOR

TECHNICAL FIELD

The present invention relates to a wireless communication system, and more particularly, to a method and device for receiving data cooperatively transmitted independently from a plurality of base stations.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present invention provides a method of determining a receiving beam for efficiently beamforming receiving data in which a plurality of base stations cooperatively perform analog beamforming transmission in order to improve data transmission efficiency and throughput in a wireless communication system.

The technical problems of the present invention are not limited to the above-described technical problems and the other technical problems will be understood by those skilled in the art from the following description.

Technical Solution

According to an embodiment of the present invention, a method in which a user equipment (UE) receives data in a wireless communication system includes receiving downlink control information related to downlink data transmission from at least one base station; determining receiving beams for simultaneously receiving the downlink data transmitted independently through a plurality of layer groups from a plurality of base stations including the at least one base station based on the downlink control information; and simultaneously receiving the downlink data from the plurality of base stations using the determined receiving beams, wherein the downlink control information includes beam index information about the receiving beams, and the beam index information is instructed for each of the plurality of layer groups.

Further, the downlink control information may be transmitted from a predetermined one of the plurality of base stations or the plurality of base stations.

Further, the downlink control information may further include information about the number of total ranks used for the downlink transmission, a demodulation reference signal (DMRS) configuration parameter applied to each of the plurality of layer groups, a scrambling seed parameter, data rate matching information, and/or quasi co-located (QCL) assumption.

Further, a predetermined time gap may be set between a transmission time point of the downlink control information and a transmission time point of the downlink data.

Further, the predetermined time gap may be set to the UE at a specific time or may be dynamically instructed to the UE by Layer 1 (L1) and/or Layer 2 (L2) signaling.

Further, the predetermined time gap may be set in a symbol unit.

Further, the method may further include receiving instruction information notifying simultaneous transmission of the downlink data from the plurality of base stations.

The simultaneously receiving of the downlink data may be performed after a predetermined subframe from a subframe that receives the instruction information.

Further, the instruction information may be semi-statically instructed to the UE through radio resource control (RRC) signaling or may be dynamically instructed to the UE by L1 and/or L2 signaling.

Further, whether the downlink data are simultaneously transmitted may be determined based on a rank indicator (RI) reported by the UE to the at least one base station.

Further, when the RI instructs the predetermined rank number or more, simultaneous transmission of the downlink data may be determined.

Further, the simultaneously receiving of the downlink data may be performed after a predetermined subframe from a subframe that reports the RI.

Further, each of the plurality of layer groups may be mapped to different base stations and include at least one layer.

Further, the beam index information may instruct a receiving beam direction, a receiving beam angle, and/or a receiving beam spectrum of the downlink data.

According to another embodiment of the present invention, a user equipment (UE) for receiving data in a wireless communication system includes a radio frequency (RF) unit for transmitting and receiving a radio signal; and a processor for controlling the RF unit, wherein the processor is configured to receive downlink control information related to downlink data transmission from at least one base station; to determine receiving beams for simultaneously receiving the downlink data transmitted independently through a plurality of layer groups from a plurality of base stations including the at least one base station based on the downlink control information; and to simultaneously receive the downlink data from the plurality of base stations using the determined receiving beams, wherein the downlink control information includes beam index information about the receiving beams, and the beam index information is instructed for each of the plurality of layer groups.

Advantageous Effects

According to an embodiment of the present invention, because an optimal receiving beam direction is determined according to a direction of a transmission beam transmitted from a base station, a data reception performance can be improved.

Further, according to an embodiment of the present invention, by separating receiving beam directions according to a transmission beam direction of a plurality of base stations cooperatively transmitting data, data can be simultaneously received in multiple angles, thereby improving throughput.

Further, according to an embodiment of the present invention, because a base station directly instructs beam index information of optimal receiving beams for data reception per layer group, the burden can be reduced in which an UE should properly select/determine an optimal receiving beam.

The effects that can obtain from the present invention are not limited to the above-described effects and the other objects will be understood by those skilled in the art from the following description.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Figure 1:
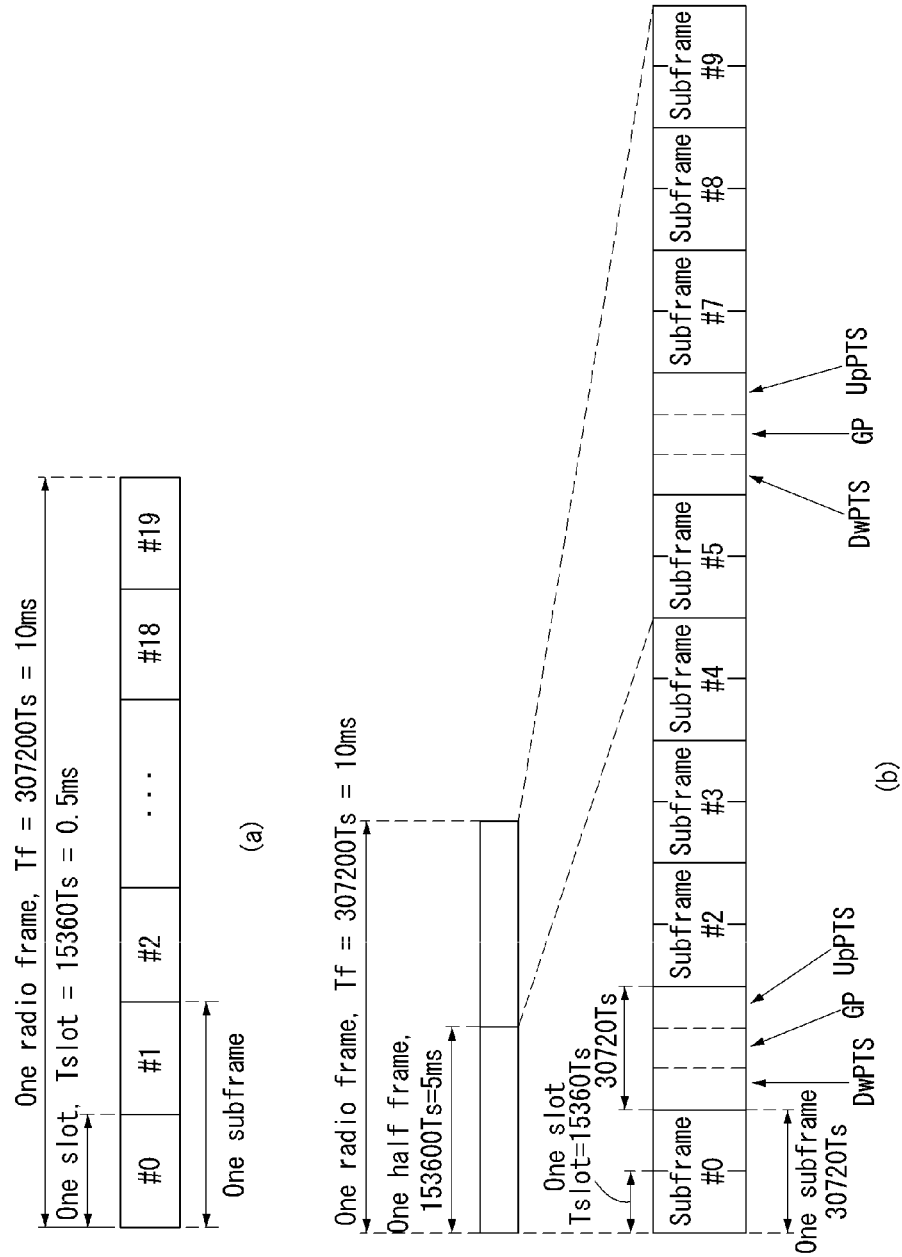
FIG. 1 illustrates the structure of a radio frame in a wireless communication system to which the present invention may be applied.

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), an access point (AP), gNB (g-NodeB), or NR(NewRAT)/5G-NodeB. Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 illustrates a structure of a radio frame in a wireless communication system to which the present invention may be applied.

3GPP LTE/LTE-A supports a radio frame structure type 1 applicable to Frequency Division Duplex (FDD) and a radio frame structure type 2 applicable to Time Division Duplex (TDD).

FIG. 1(a) illustrates a structure of a radio frame type 1. The radio frame is configured with 10 subframes. One subframe is configured with two slots in a time domain. A time taken to transmit one subframe is referred to as a transmission time interval (TTI). For example, one subframe may have a length of 1 ms, and one slot may have a length of 0.5 ms.

One slot includes a plurality of orthogonal frequency division multiplexing (OFDM) symbols in the time domain and includes a plurality of resource blocks (RBs) in a frequency domain. Because 3GPP LTE uses OFDMA in a downlink, an OFDM symbol represents one symbol period. The OFDM symbol may be one SC-FDMA symbol or symbol period. The resource block is a resource allocation unit and includes a plurality of consecutive subcarriers in one slot.

FIG. 1(b) illustrates a frame structure type 2. The radio frame type 2 is configured with two half frames, and each half frame is configured with five subframes, a downlink pilot time slot (DwPTS), a guard period (GP), and an uplink pilot time slot (UpPTS), and one of the subframes is configured with two slots. The DwPTS is used for initial cell search, synchronization, or channel estimation in the UE. The UpPTS is used for matching channel estimation at a base station and uplink transmission synchronization of the UE. The guard period is a period for eliminating interference occurring in an uplink due to multipath delay of a downlink signal between the uplink and a downlink.

In the frame structure type 2 of a TDD system, an uplink-downlink configuration is a rule representing whether the uplink and the downlink are allocated (or reserved) for all subframes. Table 1 represents an uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of a radio frame, 'D' denotes a subframe for downlink transmission, 'U' denotes a subframe for uplink transmission, and 'S' denotes a special subframe configured with three fields of a DwPTS, a GP, and an UpPTS. The uplink-downlink configuration may be classified into seven types, and positions and/or the number of the downlink subframe, the special subframe, and the uplink subframe are different for each configuration.

A time point in which the downlink is switched to the uplink or a time point in which the uplink is switched to the downlink is referred to as a switching point. Switch-point periodicity means a period in which switching of the uplink subframe and the downlink subframe is equally repeated, and both 5 ms and 10 ms are supported. In a period of a 5 ms downlink-uplink switching point, the special subframe S exists in each half-frame, and in a period of a 5 ms downlink-uplink switching point, the special subframe S exists only in a first half-frame.

In all configurations, 0th and 5th subframes and the DwPTS are periods for only downlink transmission. A subframe immediately following the UpPTS and the subframe is always a period for uplink transmission.

Such an uplink-downlink configuration is system information, and both the base station and the UE may know the uplink-downlink configuration. The base station may transmit only an index of configuration information whenever the uplink-downlink configuration information is changed to notify the UE of the change of an uplink-downlink allocation state of the radio frame. Further, the configuration information may be transmitted through a Physical Downlink Control Channel (PDCCH) as a kind of downlink control information, as in other scheduling information and may be commonly transmitted to all UEs in a cell through a broadcast channel as broadcast information.

Table 2 represents a configuration (DwPTS/GP/UpPTS length) of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

A structure of the radio frame is merely an example, and the number of subcarriers included in the radio frame or the number of slots included in the subframe, and the number of OFDM symbols included in the slot may be variously changed.

Figure 2:
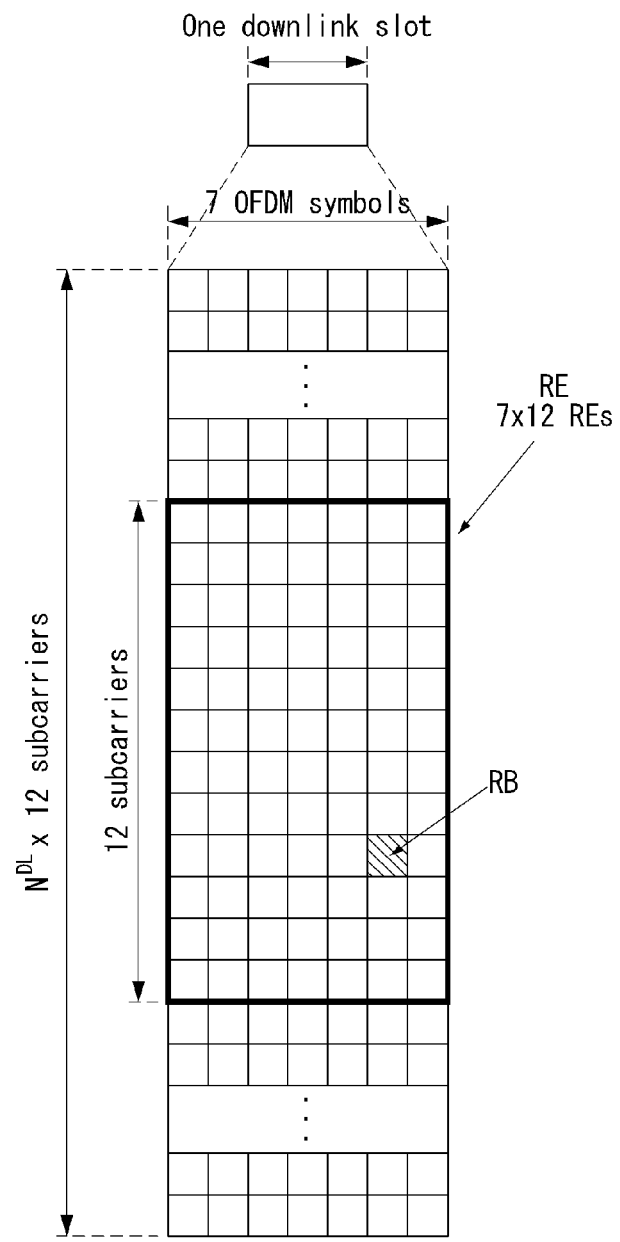
FIG. 2 is a diagram illustrating a resource grid for a downlink slot in a wireless communication system to which the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
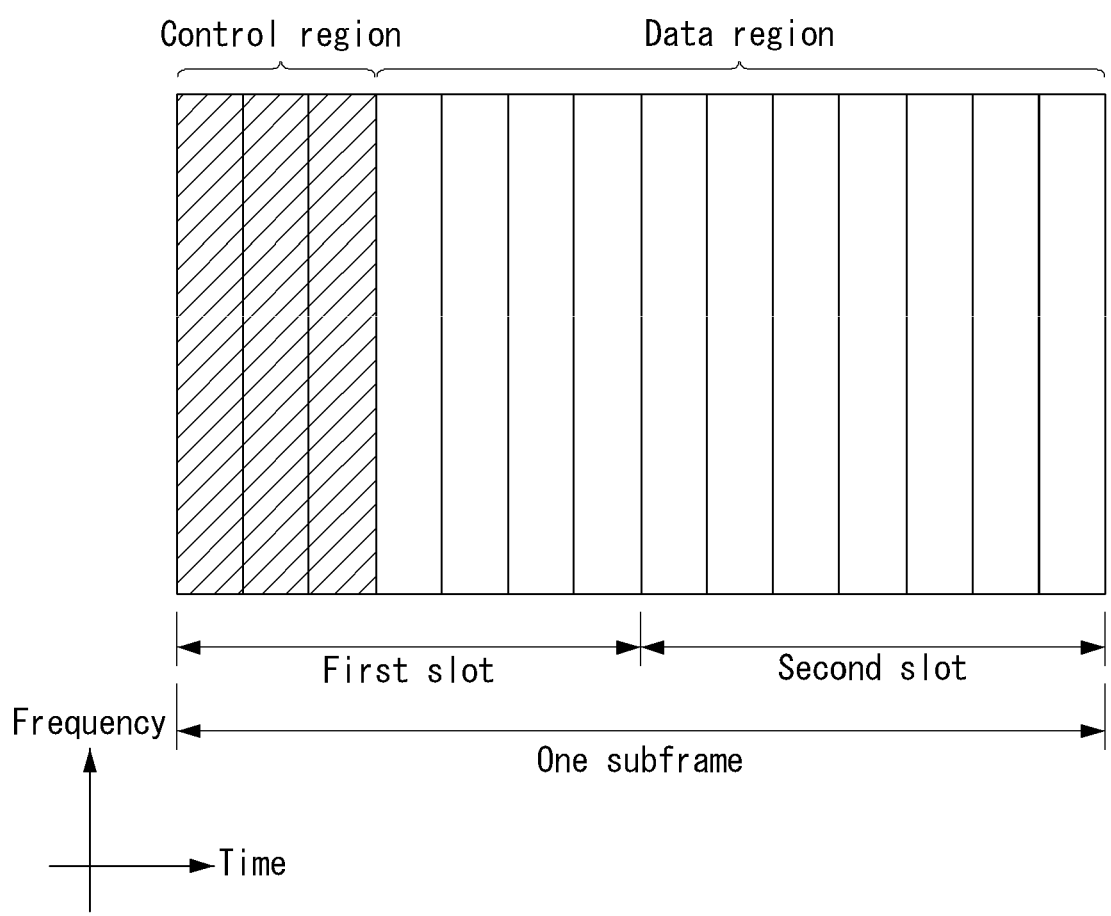
FIG. 3 illustrates a structure of downlink subframe in a wireless communication system to which the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARD). Control information transmitted in a PDCCH is called Downlink Control Information (DCI). DCI includes uplink resource allocation information, downlink resource allocation information, or an uplink transmission (Tx) power control command for a specific UE group.

The PDCCH may carry resource allocation and transmission format (also referred to as downlink grant) of a Downlink Shared Channel (DL-SCH), resource allocation information (also referred to as uplink grant) of a Uplink Shared Channel (UL-SCH), paging information in a paging channel (PCH), system information in a DL-SCH, resource allocation for an upper-layer control message such as a random access response transmitted in a PDSCH, a set of transmission power control commands for individual UEs in a random UE group, and activation of Voice over IP (VoIP). A plurality of PDCCHs may be transmitted in a control region, and the UE may monitor the plurality of PDCCHs. The PDCCH is configured with a set of one or a plurality of consecutive control channel elements (CCEs). The CCE is a logical allocation unit used for providing a coding rate according to a state of a radio channel to the PDCCH. The CCE corresponds to a plurality of resource element groups. A format of the PDCCH and the number of bits of an available PDCCH are determined according to an association relationship between the number of CCEs and a coding rate provided by the CCEs.

The base station determines a PDCCH format according to DCI to be transmitted to the UE and attaches a Cyclic Redundancy Check (CRC) to the control information. The CRC is masked with a unique identifier (referred to as a Radio Network Temporary Identifier (RNTI)) according to an owner or use of the PDCCH. When the PDCCH is for a particular UE, a unique identifier of the UE, for example, Cell-RNTI (C-RNTI) may be masked in the CRC. Alternatively, in a PDCCH for a paging message, a paging indication identifier, for example, a Paging-RNTI (P-RNTI) may be masked in the CRC. In a PDCCH for system information, more specifically, a system information block (SIB), a system information identifier and a system information RNTI (SI-RNTI) may be masked in the CRC. In order to instruct a random access response, which is a response to transmission of a random access preamble of the UE, a random access-RNTI (RA-RNTI) may be masked in the CRC.

Figure 4:
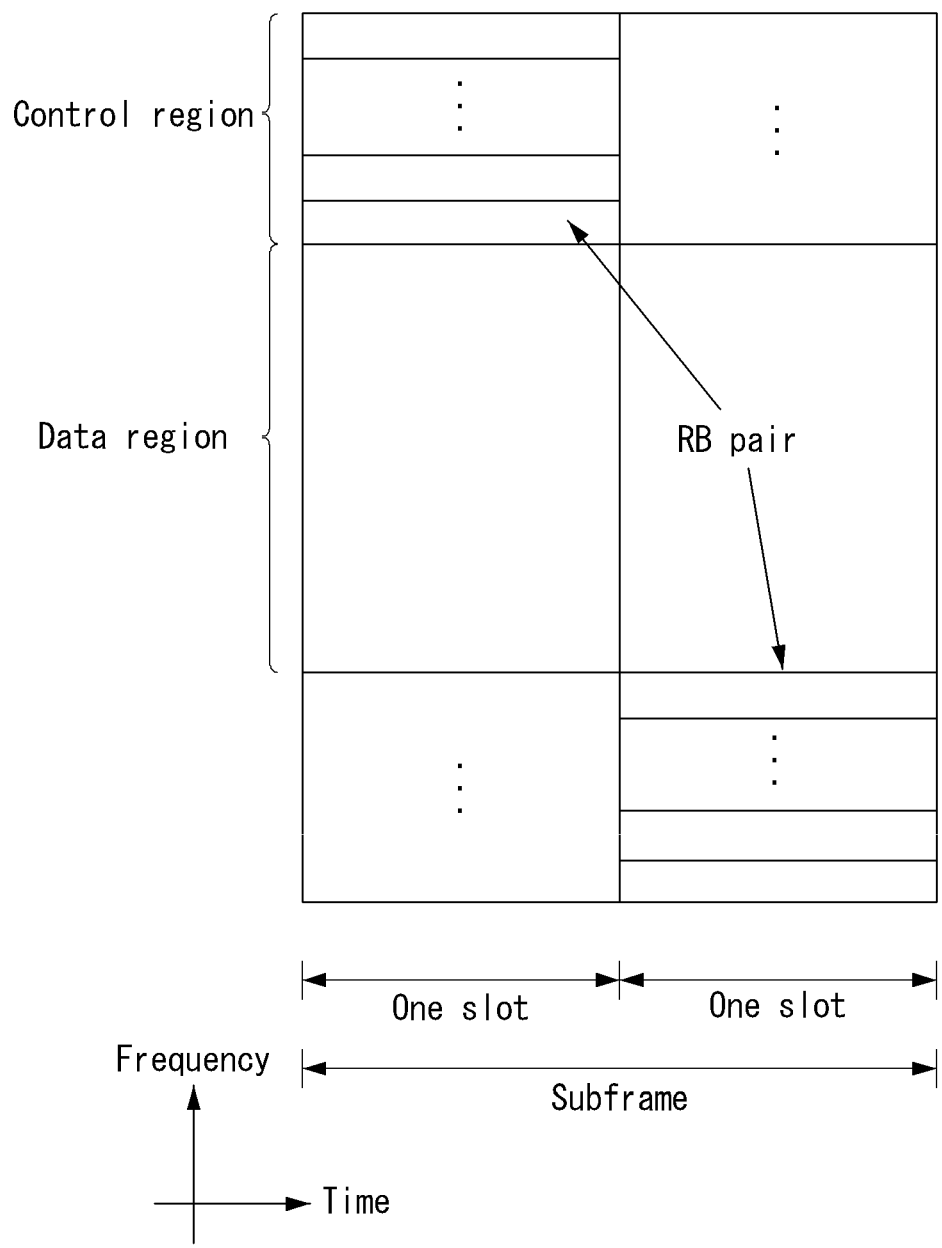
FIG. 4 illustrates a structure of uplink subframe in a wireless communication system to which the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

As more communication devices demand a more communication capacity, there is a need for improved mobile broadband communication over existing RAT. Further, Massive Machine Type Communications (MTC), which provides various services at any time and place by connecting many devices and objects, is one of major issues to be considered in next generation communication. Further, a communication system design considering service/UE sensitive to reliability and latency in next generation communication is being discussed. In this way, the introduction of next generation RAT in consideration of enhanced mobile broadband communication, massive MTC, Ultra-Reliable and Low Latency Communication (URLLC) is being discussed, and this technology may be referred to as 'new RAT'.

OFDM Numerology

A new RAT system uses an OFDM transmission method or a transmission method similar thereto and representatively has OFDM numerology of Table 3.

TABLE 3

| Parameter | Value |
| --- | --- |
| Subcarrier-spacing($\Delta f$) | 60 kHz |
| OFDM symbol length | 16.33 µs |
| Cyclic Prefix(CP) length | 1.30 µs/1.17 µs s |
| System bandwidth | 80 MHz |
| No. of available subcarriers | 1200 |
| Subframe length | 0.25 ms |
| The OFDM symbol number per subframe | 14 symbols |

Self-Contained Subframe Structure

Figure 5:
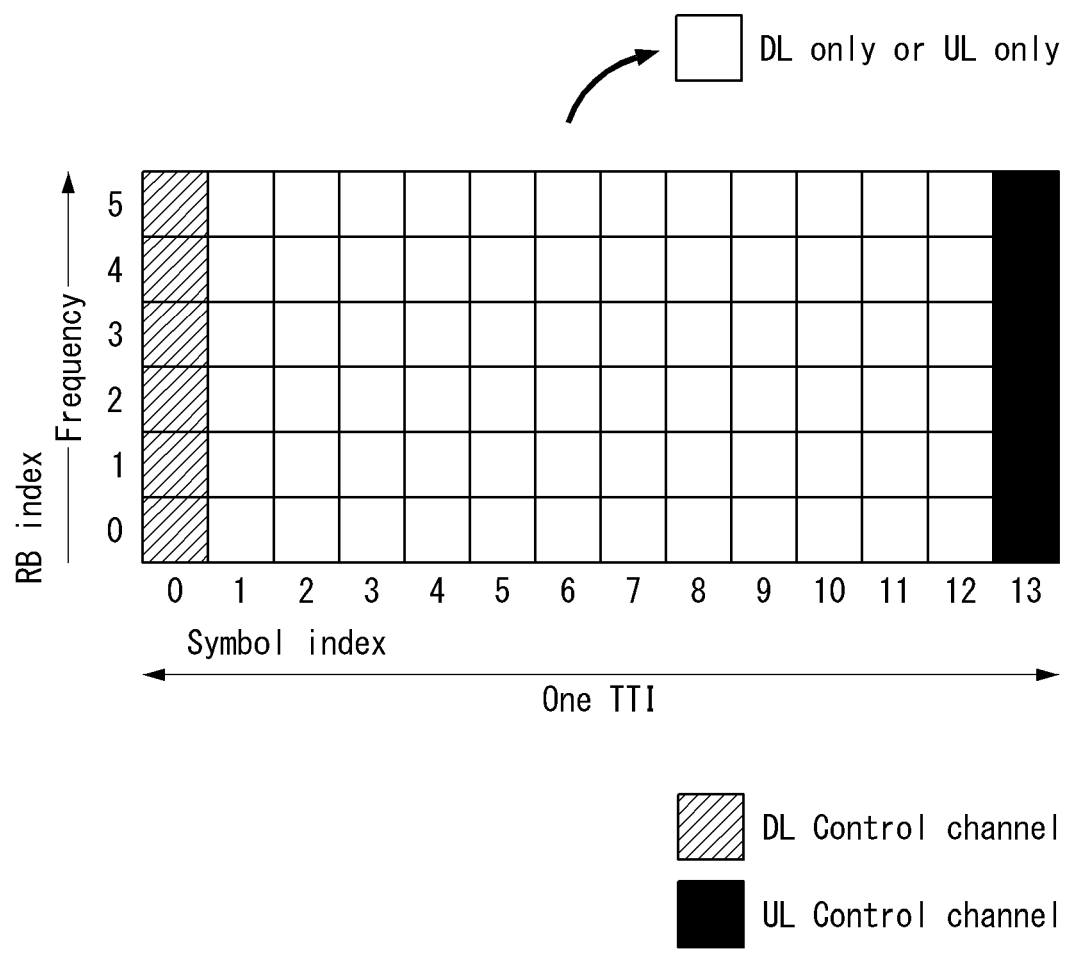
FIG. 5 illustrates a self-contained subframe structure to which the present invention may be applied.

In a TDD system, in order to minimize data transmission delay, a self-contained subframe structure of FIG. 5 is considered in fifth generation new RAT.

FIG. 5 illustrates a self-contained subframe structure to which the present invention may be applied.

In FIG. 5, a hatched region represents a transmission region of a physical channel PDCCH for DCI transmission, and a black portion represents a transmission region of a physical channel PUCCH for Uplink Control Information (UCI) transmission.

Control information in which the eNB transmits to the UE through DCI may include information on a cell configuration in which the UE should know, DL specific information such as DL scheduling, and/or UL specific information such as UL grant. Further, control information in which the UE transmits to the eNB through UCI may include an ACK/NACK report of HARQ for DL data, a CSI report on a DL channel status, and/or a scheduling request (SR).

A region without a mark in FIG. 5 may be used as a physical channel PDSCH transmission region for downlink data or as a physical channel PUSCH transmission region for uplink data. The feature of this structure is that DL transmission and UL transmission sequentially proceed in one subframe (SF) and that in the corresponding SF, DL data may be transmitted and UL ACK/NACK may be received. Therefore, according to this structure, when a data transmission error occurs, a time taken to retransmit the data is reduced, thereby minimizing latency of final data transmission.

In such a self-contained subframe structure, a time gap is required for a process in which the base station and the UE switch from a transmission mode to a reception mode or from a reception mode to a transmission mode. For this, in a subframe structure, some OFDM symbols may be set to a GP at the time of switching from a DL to a UL, and such a subframe type may be referred to as a 'self-contained SF'.

Analog Beamforming

In a Millimeter Wave (mmW), a wavelength is shortened and thus multiple antennas may be installed in the same area. That is, in a 30 GHz band, total 100 antenna elements may be installed in a 2-dimensional array at 0.5 lambda (wavelength) intervals in a panel of 5 by 5 cm with a wavelength of 1 cm. Therefore, in the mmW, by increasing a beamforming (BF) gain using multiple antenna elements, coverage is increased or throughput is increased.

In this case, when each antenna element has a transceiver unit (TXRU) so as to adjust transmission power and phase, independent beamforming is available for each frequency resource. However, to install a TXRU in all of 100 antenna elements has a problem in terms of cost effectiveness. Therefore, a method of mapping a plurality of antenna elements to one TXRU and adjusting a direction of a beam by an analog phase shifter is considered. Such an analog beamforming method has a disadvantage that it may not perform frequency selective beamforming because it may make only one beam direction in all bands.

A hybrid BF, which is an intermediate form of Digital BF and analog BF and having the B number of TXRUs fewer than the Q number of antenna elements may be considered. In this case, although there is a difference according to a connection method of the B number of TXRUs and the Q number of antenna elements, directions of beams that may be transmitted simultaneously is limited to the B number or less.

Figure 6:
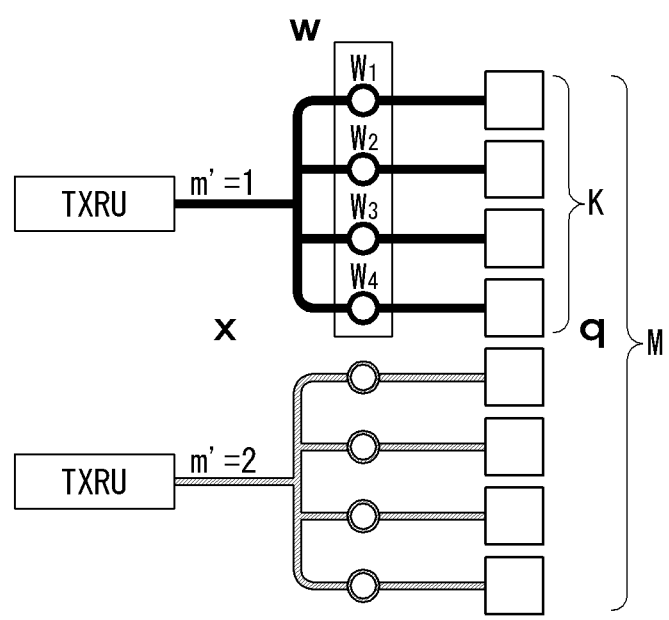
FIG. 6 illustrates a sub-array partition model, which is a first TXRU virtualization model option.
Figure 7:
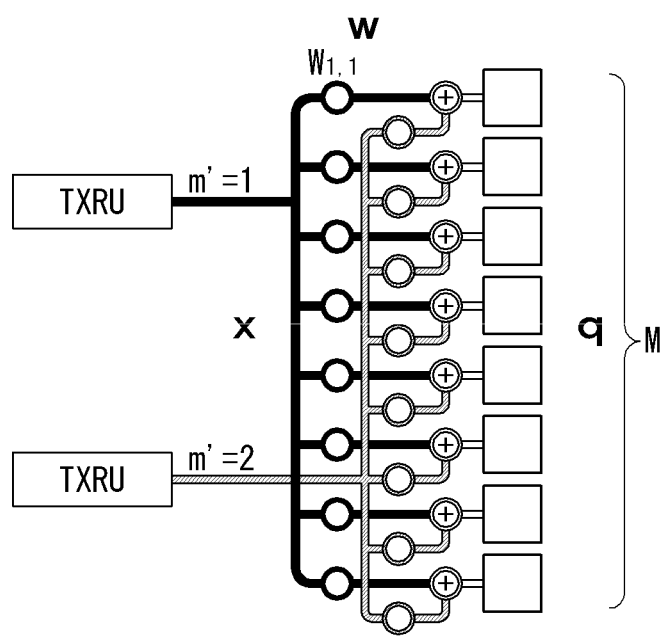
FIG. 7 illustrates a full-connection model, which is a second TXRU virtualization model option.

FIGS. 6 and 7 illustrate a typical connection method between TXRUs and antenna elements. More specifically, FIG. 6 illustrates a sub-array partition model, which is a first TXRU virtualization model option, and FIG. 7 illustrates a full-connection model, which is a second TXRU virtualization model option. In FIGS. 6 and 7, the TXRU virtualization model represents the relationship between an output signal of the TXRU and an output signal of the antenna element.

When the TXRU is a virtualization model connected to a sub-array, as in FIG. 6, the antenna element is connected to only one TXRU. Alternatively, when the TXRU is a virtualization model connected to all antenna elements, the antenna element is connected to all TXRUs. In the drawings, W represents a phase vector multiplied by an analog phase shifter. That is, an analog beamforming direction may be determined by W. Here, mapping between CSI-RS antenna ports and TXRUs may be 1 to 1 or 1 to many.

Reference Signal (RS)

In a wireless communication system, because data are transmitted through a wireless channel, a signal may be distorted during transmission. In order for a receiving terminal to accurately receive the distorted signal, distortion of the received signal should be corrected using channel information. In order to detect channel information, a signal transmission method known to both the transmitting side and the receiving side and a method of detecting channel information using a distortion level when a signal is transmitted through a channel are mainly used. The above-mentioned signal is referred to as a pilot signal or a reference signal (RS).

Further, in recent years, most mobile communication systems use a method of improving transmission/reception data efficiency by employing multiple transmitting antennas and multiple receiving antennas instead of using one transmitting antenna and one receiving antenna when transmitting a packet. When transmitting and receiving data using a multiple input/output antenna, in order to accurately receive a signal, a channel state between the transmitting antenna and the receiving antenna should be detected. Therefore, each transmitting antenna should have an individual reference signal.

In the mobile communication system, an RS may be roughly divided into two according to a purpose thereof. There are a RS for obtaining channel state information and an RS used for data demodulation. Because the former is for the purpose in which a UE obtains channel state information to a downlink, the former should be transmitted in a wide band, and even a UE not receiving downlink data in a specific subframe should be able to receive and measure the RS. Further, the RS is used for radio resource management (RRM) measurement such as handover. The latter is an RS transmitted together with a corresponding resource when a base station sends a downlink, and the UE may receive the corresponding RS to perform channel estimation, and thus may demodulate the data. The RS should be transmitted in a region in which data are transmitted.

The downlink reference signal includes one common reference signal (CRS) for measurement of handover and acquisition of information on a channel state shared by all UEs in the cell and a dedicated reference signal (dedicated RS) used for data demodulation for only a specific UE. Such reference signals may be used for providing information for demodulation and channel measurement. That is, the DRS is used only for data demodulation, and the CRS is used for two purposes of channel information acquisition and data demodulation.

The receiving side (i.e., the UE) measures a channel state from the CRS and feeds back an indicator related to a channel quality, such as a Channel Quality Indicator (CQI), a Precoding Matrix Index (PMI), and/or a Rank Indicator (RI) to the transmitting side (i.e., the base station). The CRS is also referred to as a cell-specific RS. However, a reference signal related to feedback of channel state information (CSI) may be defined as a CSI-RS.

In a 3GPP LTE(-A) system, a UE is defined to report CSI to a base station (BS), wherein the CSI may be referred to as information that may represent a quality of a wireless channel (or referred to as a link) formed between the UE and an antenna port. For example, a rank indicator (RI), a precoding matrix indicator (PMI), and/or a channel quality indicator (CQI) may correspond to CSI. Here, the RI denotes rank information of a channel and means the number of streams in which the UE receives through the same time-frequency resource. Because the RI is determined by being subordinated to long-term fading of the channel, the RI may be fed back from the UE to the base station at a longer period than that of the PMI and the CQI. The PMI is a value reflecting a channel space characteristic and indicates a preferred precoding index of the UE based on metric such as an SINR. The CQI is a value representing intensity of a channel and generally means a reception SINR in which the base station may obtain when using the PMI.

In the 3GPP LTE(-A) system, the base station may set a plurality of CSI processes to the UE and receive a report of CSI of each process. Here, the CSI process may include a CSI-RS for measuring a signal quality from the base station and a CSI-interference measurement (CSI-IM) resource for measuring interference.

When data demodulation on the PDSCH is required, the DRS may be transmitted through the resource elements. The UE may receive whether the DRS exists through an upper layer and is valid only when the corresponding PDSCH is mapped. The DRS may be referred to as a UE-specific RS or a demodulation RS (DMRS).

Quasi Co-Located (QCL) Between Antenna Ports

In the present invention, when the UE receives data (e.g., PDSCH), there is considered a method of demodulating with an UE-specific RS such as a specific DMRS. Because such a DMRS is transmitted only for a scheduled RB(s) of the corresponding PDSCH and is transmitted only during a time period in which a scheduled PDSCH is transmitted, there may be a limitation in a reception performance in performing channel estimation with only the corresponding DMRS. For example, in performing channel estimation, an estimated value of a major large-scale parameter (LSP) of a wireless channel is required, and a DMRS density may be insufficient in obtaining the estimated value with only the DMRS existing in a time/freq domain in which the scheduled PDSCH is transmitted. Therefore, in order to support implementation of such a UE, the LTE-A standard defines a quasi co-location signaling/assumption/behavior between the following RS ports and thus supports methods of setting/operating the UE.

QC/QCL (quasi co-located or quasi co-location) may be defined as follows.

When two antenna ports are in a QC/QCL relation (or QC/QCL), the UE may assume that a large-scale property of a signal transmitted through one antenna port may be inferred from a signal transmitted through the other antenna port. Here, the large-scale property includes at least one of delay spread, Doppler spread, frequency shift, average received power, and received timing.

Further, QC/QCL may be defined as follows. When two antenna ports are in QC/QCL relation (or QC/QCL), the UE may assume that a large-scale property of a channel in which one symbol is transmitted through one antenna port may be inferred from a radio channel in which one symbol is transmitted through the other antenna port. Here, the large-scale property includes at least one of delay spread, Doppler spread, Doppler shift, an average gain, and average delay.

That is, two antenna ports are in a QC/QCL relation (or QC/QCL), which means that a large-scale property of a radio channel from one antenna port is the same as a large-scale property of a radio channel from the other antenna port. Considering a plurality of antenna ports to which RSs are transmitted, when antenna ports to which two different kinds of RSs are transmitted are in a QCL relation, a large-scale property of a radio channel from one kind of antenna port may be replaced with a large-scale property of a radio channel from the other kind of antenna port.

In the present specification, the above QC/QCL related definitions are not distinguished. That is, the QC/QCL concept may follow one of the above definitions. Alternatively, in a similar form, a QC/QCL concept definition may be changed in a form (e.g., the UE may assume as an antenna port transmitting at the same transmission point) that may be assumed to be transmitted at a co-location between antenna ports in which the QC/QCL assumption is established, and the spirit of the present invention includes such similar variations. In the present invention, for convenience of description, the QC/QCL related definitions are used in combination.

According to the concept of the QC/QCL, the UE may not assume the same large-scale property among radio channels from the corresponding antenna ports for non-QC/QCL antenna ports. That is, in this case, the UE should perform independent processing for each preset non-QC/QCL antenna port with respect to timing acquisition and tracking, frequency offset estimation and compensation, delay estimation, and Doppler estimation.

There is a merit that the UE may perform the following operations for antenna ports that may assume QC/QCL:

For delay spread and Doppler spread, the UE may equally apply a power-delay profile, delay spread and Doppler spectrum, and Doppler spread estimation results for a wireless channel from any one antenna port to a Wiener filter used for channel estimation of a wireless channel from another antenna port.

For frequency shift and received timing, the UE may perform time and frequency synchronization of any one antenna port and then apply the same synchronization to demodulation of another antenna port.

For average received power, the UE may average Reference Signal Received Power (RSRP) measurements for two or more antenna ports.

For example, when a DMRS antenna port for downlink data channel demodulation is QC/QCL with a CRS antenna port of a serving cell, upon estimating a channel through the corresponding DMRS antenna port, the UE may equally apply large-scale properties of a radio channel estimated from the CRS antenna port thereof to improve a DMRS based downlink data channel receiving performance.

This is because the CRS is a reference signal broadcasted with a relatively high density over every subframe and an entire band and thus estimates of a large-scale property may be obtained more stably from the CRS. However, the DMRS is UE-specifically transmitted for a specific scheduled RB, and because a precoding matrix may change in which the base station uses for transmission, an effective channel received to the UE may vary in a precoding resource block group (PRG) unit and thus even if a plurality of PRGs are scheduled, when the DMRS is used for estimating a large-scale property of a wireless channel over a wide band, performance deterioration may occur. Further, a transmission period of the CSI-RS may be several to several tens of ms, and a resource block has a low average density of one resource element per antenna port and thus when the CSI-RS is also used for estimating a large-scale property of the radio channel, performance deterioration may occur.

That is, by performing QC/QCL assumption between the antenna ports, the UE may use the QC/QCL assumption for detection/reception of a downlink reference signal, channel estimation, and channel status report.

The UE may assume that antenna ports 0-3 for a serving cell and an antenna port for a PSS/SSS have a QCL relation with respect to Doppler shift and average delay.

CA-Based CoMP Operation

In systems after LTE, cooperative multi-point (CoMP) transmission may be implemented using a carrier aggregation (CA) function in LTE.

Figure 8:
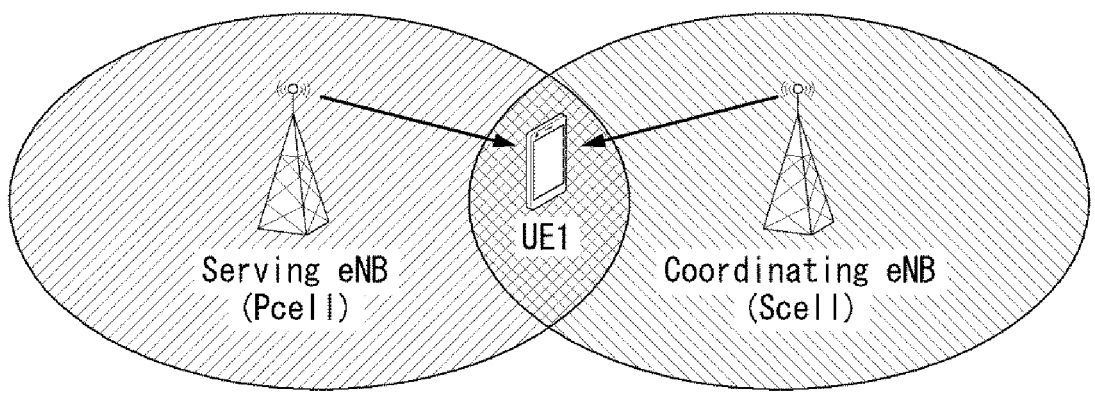
FIG. 8 is a diagram illustrating a carrier merging-based CoMP system in a wireless communication system to which the present invention may be applied.
Figure 8:
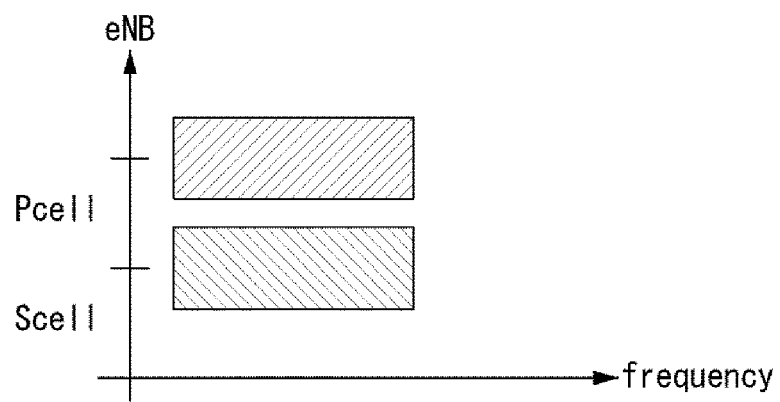

FIG. 8 is a diagram illustrating a carrier merging-based CoMP system in a wireless communication system to which the present invention may be applied.

FIG. 8 illustrates a case in which a primary cell (PCell) carrier and a secondary cell (SCell) carrier use the same frequency band with a frequency axis and are allocated to two geographically separated eNBs, respectively.

A serving eNB may allocate a PCell to a UE 1, and a neighboring base station giving much interference may allocate a SCell and thus various DL/UL CoMP operations such as JT, CS/CB, and dynamic cell selection are available.

FIG. 8 shows an example in which a UE merges two eNBs into a PCell and a SCell, respectively, but in practice, a UE merges three or more cells, some cells thereof may perform a CoMP operation in the same frequency band, and other cells may perform a simple CA operation in other frequency bands, and in this case, the PCell does not necessarily participate in the CoMP operation.

Independent-Layer Joint Transmission Having Analog Beamforming

In the present specification, when the UE receives a signal from the base station by forming a receiving beam Rx by analog beamforming using multiple antenna elements, for a dynamic point selection (DPS) operation (and/or a joint transmission (JT) operation), a method of dynamically changing an Rx beam according to a change of a transmission base station (set) is proposed.

First, DPS will be described.

The DPS means a transmission method in which transmission points are dynamically selected/changed according to a change in channel and interference conditions. Even in an environment of a mmW band, for improving connection reliability and for load balancing between transmission reception points (TRP) (or referred to as a 'base station'), a Coordinated Multi-Point (CoMP) of a DPS method is estimated as an effective transmission method.

Figure 9:
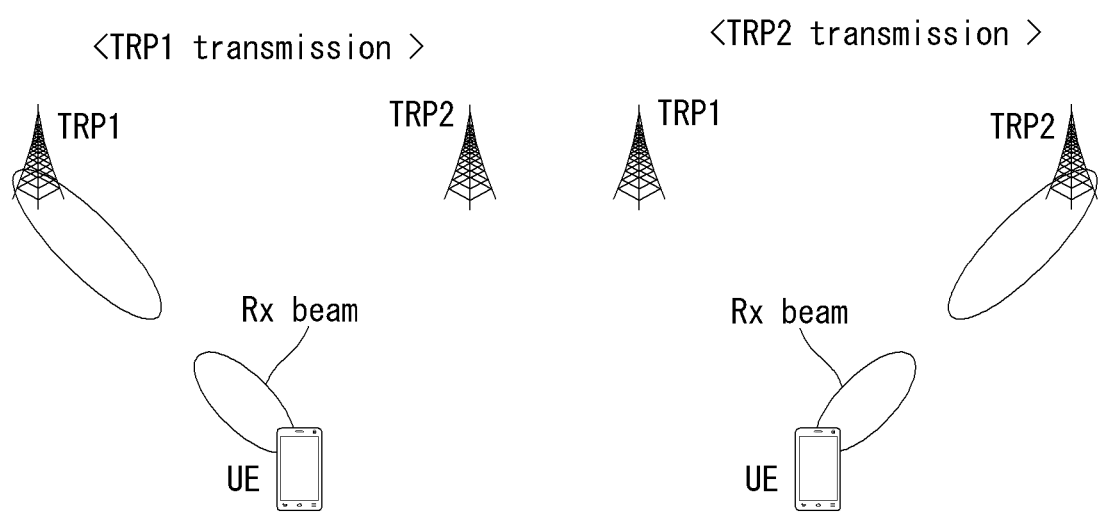
FIG. 9 illustrates a DPS CoMP operation between two TRPs and a UE.

FIG. 9 illustrates a DPS CoMP operation between two TRPs and a UE.

According to the DPS CoMP operation, by selecting a TRP having a better channel condition and/or a TRP having a low load among a TRP 1 and a TRP 2 corresponding to the base station as a transmission point for transmitting a signal to the UE, transmission efficiency can be increased. By dynamically selecting/changing a TRP for transmitting a signal in a subframe (SF) unit (i.e., SF by SF), transmission efficiency can be maximized. In this case, when the UE forms an Rx beam by analog beamforming and receives a signal from the base station, an optimal Rx beam direction of the UE is selected/determined according to whether a signal transmitted by which TRP is received, as shown in FIG. 9. Therefore, it is necessary to notify the UE in advance a TRP to transmit a signal, which conflicts with requirement for a transmission TRP dynamic change of an SF unit.

Figure 10:
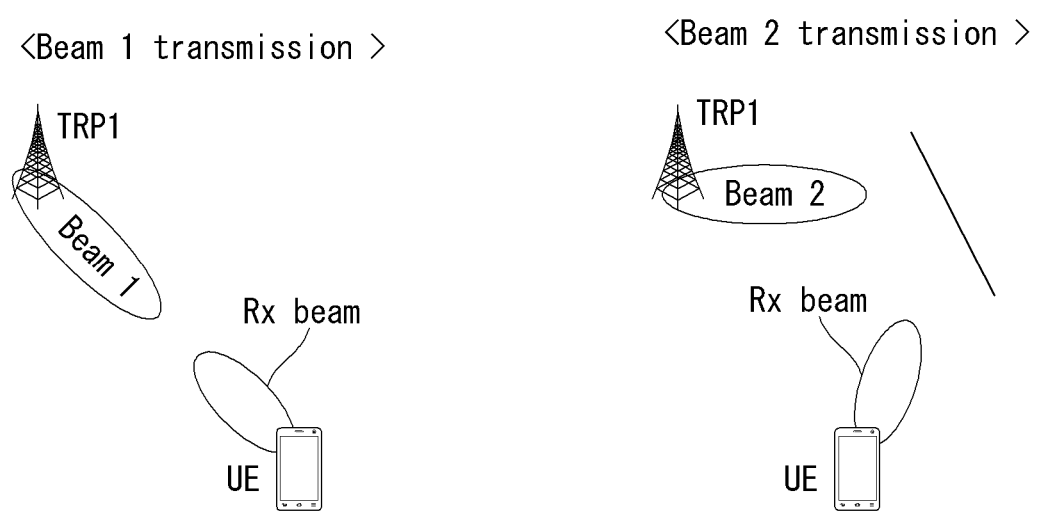
FIG. 10 illustrates a method of transmitting data by a dynamic beam selection operation in a single TRP.

FIG. 10 illustrates a method of transmitting data by a dynamic beam selection operation in a single TRP.

When the base station transmits a signal to a transmission Tx beam having a better channel condition or a Tx beam selected considering multiplexing with a signal transmitted to another UE among a beam 1 and a beam 2, transmission efficiency can be increased. When the base station dynamically selects/changes a beam direction to transmit the signal in an SF unit (i.e., SF by SF), transmission efficiency can be maximized. In this case, an optimum Rx beam direction of the UE is selected/determined according to a beam direction in which the base station transmits signals, as shown in FIG. 10.

For the above-described data reception operation in relation to FIGS. 9 and 10, the UE may previously measure reference signal received power of a Beamformed Reference Signal (RSRP) and report a plurality of strong beam directions to the base station based on a measurement result. For this, the TRP may send one B-RS to the UE for each Tx beam direction. That is, when the TRP transmits signals in the N number of Tx beam directions, the TRP transmits the N number of B-RSs, and the N number of Tx beam directions have the one-to-one mapping relationship with the N number of B-RSs. Here, the N number of B-RSs may be distinguished by allocating different port indices.

The UE may measure RSRP of B-RSs transmitted from a serving TRP and adjacent TRPs and report the RSRP measurement result of the plurality of strong B-RSs satisfying a predetermined condition to the base station. In this case, in order to measure RSRP of the B-RSs, the UE may determine an Rx beam for each B-RS.

When the UE reports the measured RSRP to the base station, the UE may report that the measured RSRP is RSRP of which B-RS (i.e., which Tx beam) and/or is received through/using which Rx beam. That is, the UE may report (B-RS index, Rx beam index and/or RSRP) of a plurality of strong B-RSs satisfying a predetermined condition to the base station. The base station may determine, through reported Rx beam indices, whether the UE uses another Rx beam or the same Rx beam in order to receive another Tx beam.

Alternatively, the TRP may send one CSI-RS to the UE instead of the B-RS for each Tx beam direction, and the UE may report the CSI-RS measurement result to the TRP. In this case, the UE may report (CSI-RS index and/or Rx beam index) to a plurality of CSI-RSs satisfying a predetermined condition to the TRP.

Based on the reported RSRP, the base station may select a TRP to participate in data transmission for the corresponding UE and determine a Tx beam set of the selected TRP. Here, beams constituting the Tx beam set (or included in the Tx beam set) may correspond to beams transmitted/formed in the same TRP and/or beams transmitted/formed in another TRP. The Tx beam set determined in this way may be instructed directly or indirectly (or explicitly/implicitly) to the UE according to a method to be described below.

Method 1-1) the base station may directly (or explicitly/implicitly) notify the UE of a Tx beam set through Radio Resource Control (RRC) signaling. In this case, the UE may determine/select an optimal Rx beam for each Tx beam included in the Tx beam set. That is, the UE may determine/select an Rx beam that may optimally receive a B-RS mapped (or transmitted through each Tx beam) to each Tx beam belonging to the Tx beam set instructed by the base station.

Method 1-2) the base station may set a CSI-RS mapped (or transmitted through each Tx beam) for each Tx beam belonging to the Tx beam set to the UE. That is, when there are the K number of Tx beams in the Tx beam set, the base station may notify the UE of the K number of CSI-RS configurations (or CSI-RS resources). The UE may determine an Rx beam that may be optimally received for each preset CSI-RS configuration/resource. Alternatively, the base station may set a beam refinement RS (BR-RS) mapped to each Tx beam belonging to the Tx beam set to the UE. The UE may determine an Rx beam that may be optimally received for each preset BR-RS.

A name of a reference signal used for determining an analog beam direction for the UE is not limited to the above-described BRS or BRRS and may be replaced with/referred to as various reference signals usable for performing the same function. For example, the BRS may be replaced with/referred to as a primary/first CSI-RS, a primary synchronization signal/sequence (PSS), a secondary synchronization signal/sequence (SSS), a synchronization signal/sequence (SS) block, an NR-PSS, and/or an NR-SSS, and the BRRS may be replaced with/referred to as a secondary/second CSI-RS.

By the above method, a base station Tx beam and a UE Rx beam may be paired. In order for the UE to receive a signal with an optimal Rx beam (in real time), the following method for dynamically notifying switching of the Tx beam of the base station is proposed.

Method 2-1) a method of designating a PDSCH Tx beam with a PDCCH is proposed. That is, the base station may designate/instruct an index (and/or the same information as/information similar to the index, i.e., a B-RS port index using the same Tx beam, a CSI-RS configuration index/number, and/or BR-RS port index) of a beam to transmit a PDSCH to DCI transmitted through the PDCCH. When the B-RS port index (and/or CSI-RS configuration index/number, BR-RS port index) is designated, the UE may receive the corresponding PDSCH through an Rx beam using when receiving the designated B-RS port (and/or CSI-RS, BR-RS port). According to this method, because an Rx beam for receiving the PDSCH is determined through PDCCH decoding, a predetermined time gap (e.g., a gap of a symbol level) is required between a PDCCH transmission end point and a PDSCH transmission start point. Such time gap related information may be defined/set in advance or may be dynamically changed/updated by L1 and/or L2 signaling and the like. As a result, the UE may complete DCI decoding during a time gap to determine an optimal Rx beam and receive a PDSCH using the optimal Rx beam.

In the proposed method, an Rx beam configuration of the UE for PDCCH reception may be performed according to the following methods.

2-1-1) The PDCCH may be transmitted with a fixed Tx beam of a fixed TRP. That is, a serving Tx beam that transmits in advance the PDCCH may be designated. For example, the PDCCH may be transmitted with a particular Tx beam (e.g., first Tx beam) in a Tx beam set. In this case, the UE may receive the PDCCH with an Rx beam paired with the designated Tx beam.

2-1-2) The PDCCH may be received in the UE with a wide Rx beam. And/or, in order to receive all signals transmitted in a direction of the Rx beams paired with Tx beams belonging to a Tx beam set, the UE may form a multi-beam to receive the PDCCH.

2-1-3) In case of having a plurality of Rx antenna ports, the UE may receive a signal by changing the Rx beam for each Rx antenna port during a PDCCH reception period. For example, when the UE has two Rx antenna ports and there are two Tx beams in a Tx beam set, the UE may receive signals using an Rx beam 1 paired with a Tx beam 1 in an Rx antenna port 1 and receive signals using an Rx beam 2 paired with a Tx beam 2 in an Rx antenna port 2.

Method 2-2) according to this method, an operation of dividing SF sets and determining a (DL) Tx beam according to the divided SF sets (or based on the SF set) and an Rx beam corresponding to/paired with the (DL) Tx beam may be proposed. For example, when an even number of Tx beams are included in the Tx beam set, SFs are divided into an even-numbered SF set and an odd-numbered SF set, and it may be determined so that a PDCCH and a PDSCH are transmitted through a Tx beam 1 in the even-numbered SF set and so that a PDCCH and a PDSCH are transmitted through a Tx beam 2 in the odd number SF set. Therefore, the UE may receive a signal with a received Rx beam 1 paired with the Tx beam 1 in the even-numbered SF set and receive a signal with the Rx beam 2 paired with the Tx beam 2 in the odd-numbered SF set.

In summary, when the SFs are divided into a plurality of (e.g., corresponding to the number of Tx beams) SF sets according to a predetermined criterion, each divided SF set may be mapped to a specific Tx beam, and a Tx beam mapped for each SF set may be transmitted. Furthermore, an Rx beam to be transmitted in the corresponding SF set based on the Tx beam mapped to the SF set may also be determined (e.g., determined to an Rx beam mapped to the corresponding Tx beam).

2-2-1) In order to maintain and use the Tx beam selected in the proposed method 2-2 for a predetermined time period, the same Tx beam may be used for PDCCH and PDSCH transmissions in consecutive SFs. That is, when the PDCCH and the PDSCH are transmitted in a burst form in consecutive SFs, the Tx beam may be determined based on an SF set to which a first SF of the burst belongs (e.g., determined to the same Tx beam as that transmitted in the first SF). In this method, when a PDCCH and a PDSCH have been transmitted to a corresponding UE in a previous SF (e.g., the first SF), the UE may assume that the same Tx beam as that used in the previous SF (e.g., the first SF) has been used even in a current SF and receive a signal using an Rx beam paired with the corresponding Tx beam. Therefore, in the proposed method, in order to change the Tx beam, during a particular SF period (e.g., during one SF), data transmission to the UE may be stopped.

Method 2-3) According to this method, the base station may instruct the UE in advance with DCI whether to change the TRP. The base station may notify a Tx beam to transmit a PDCCH and a PDSCH at a specific time point (e.g., from some future SF) through DCI transmitted through the PDCCH. That is, the Tx beam instructed to the UE in the n-th SF may be applied/used from the (n+k) th SF. And/or, the base station may divide SFs into groups, for example, may group SFs during 10 ms into one group and instruct a Tx beam to be used in a next SF group in the corresponding SF group.

2-3-1) In the proposed method, when the UE may not successfully decode DCI including a Tx beam instruction, the UE may not properly set an Rx beam for reception of a next PDCCH and thus a continuous DCI reception error may occur. To mitigate this, it is possible to designate a fallback SF at a predetermined SF interval, and in the fallback SF, the PDCCH and the PDSCH may be transmitted only through a serving Tx beam. Therefore, the UE may receive a signal with an Rx beam paired with the serving Tx beam in a fallback SF of a predetermined SF interval.

In the above proposed methods, the PDSCH and the PDCCH transmitting scheduling DCI thereof may be i) transmitted by the same Tx beam in the same TRP or ii) transmitted by another Tx beam. After receiving the PDSCH, the UE may report whether decoding of the corresponding PDSCH (or DCI transmitted through the corresponding PDSCH) is successful (or HARQ ACK/NACK feedback information) to the base station through the PUCCH. In this case, the Tx beam used by the UE for PUCCH transmission may be determined through the following method.

Method 3-1) An Rx beam of the UE paired with a Tx beam of a TRP designated by RRC signaling is used as an UE Tx beam for PUCCH transmission Method 3-2) An Rx beam of the UE paired with a Tx beam of a TRP designated/instructed in scheduling DCI of the PDSCH is used as an UE Tx beam for PUCCH transmission Method 3-3) An Rx beam of the UE used for receiving scheduling DCI of the PDSCH is used as an UE Tx beam for PUCCH transmission.

Method 3-4) An Rx beam of the UE used for receiving the PDSCH is used as an UE Tx beam for PUCCH transmission A brief summary of the above description is as follows:
1. Motive
Even in a mmW environment, a DPS method CoMP should be supported for improving connection reliability and for load balancing between a TRP and/or a beam, A direction of receiving analog beamforming of the UE should be determined/changed according to a transmission TRP or beam direction, When the UE has only two ports (one in each of H and V slants), the UE may not simultaneously receive signals of two TRPs and/or beams having different directions (An embodiment of a case of simultaneously JT receiving a TRP or a beam of different directions as the UE has 4 ports will be described below)

Necessity of Dynamic Switching of a Transmission TRP and/or a Beam

2. Suggestions

Method 1) Designate a PDSCH Tx Beam with a PDCCH Tx beam indicator: notify the PDSCH Tx beam with DCI and/or notify a B-RS port index or a CSI-RS configuration index/number using the same Tx beam as that of (PDCCH and/or PDSCH)

PDCCH decoding delay may have a problem in dynamic switching an Rx beam (→a predetermined time gap for securing a PDCCH decoding time may be set)

Transmit DCI with a serving Tx beam.

Method 2) Division According to a SF Set

Divide an SF set (e.g., an even-numbered SF set and an odd-numbered SF set), and determine a DL transmission TRP for each divided SF set (or based on the SF set)

Monitor a PDCCH of a multi-TRP by dividing an SF

In the case of transmitting a PDSCH in consecutive SFs (i.e., in a plurality of SFs transmitted in a burst form), determine a Tx beam based on a set to which a first SF of the burst belongs, and thus in order to change the Tx beam, stop transmission of a PDSCH (or data) during one SF Method 3) Instruct in Advance Whether to Change a TRP with DCI Switch to a serving Tx beam reception mode in a fallback SF in order to recover an instruction error 3. Considerations B-RS report:

The UE reports a plurality of strong/robust beam directions to the base station, The UE reports RSRP in a form of (TRP Tx beam ID, UE Rx beam ID)

Determine whether signals from a plurality of (e.g., two) TRPs are covered by the same Rx beam of the UE.

PDCCH transmission TPR:

Transmit only a primary TPR (TPR1),

Transmit a PDSCH in a PDCCH transmission TRP,

Scrambling issue per cell.

ACK/NACK feedback:

Set a PUCCH Tx beam direction with primary TPR,

Set a PUCCH Tx beam direction with a PDSCH transmission TRP.

Hereinafter, QCL assumption and interference management to which the present invention may be applied will be described.

In NR, all physical channels and reference signals may be transmitted using antenna ports. In NR, the antenna port definition may be the same as LTE. That is, the antenna port is defined such that a channel carrying a symbol on the antenna port may be inferred from a channel in which the other symbol is carried in the same antenna port.

Parameters for antenna port QCL in NR (when QCL is supported) may include an average gain, average delay, delay spread, Doppler shift, and/or Doppler spread (equally to LTE). Further, parameters for additional QCL may be defined. QCL may be used for beamforming management.

In NR, at least one of the following QCL assumptions may be performed for DMRS antenna ports.

QCL through the DMRS antenna ports: all DMRS antenna ports are QCL to each other or all DMRS antenna ports are not always QCL to each other.

QCL between scheduled PRBs for the DMRS antenna port

QCL between DMRS antenna port groups

QCL between antenna ports of the other reference signal and the DMRS antenna port In NR, the antenna port of the DMRS may be used for transmitting at least physical data and/or at least one of (possibly) control channels and is used in the UE for demodulation.

All QCL assumptions that the UE is allowed to make between antenna ports should be identified and explicitly specified.

The QCL may be defined as follows:

When characteristics of a channel to which a symbol of one antenna port is transmitted may be implied from a channel to which a symbol of the other antenna port is transmitted, it may be regarded that two antenna ports are QCL (or QCL is assumed, have a QCL relation).

Interference management of different time scales may include i) semi-static/predetermined interference management and ii) dynamic interference management.

Interference control of a signal/channel from the UE(s) or to the UE(s) may be transmitted from a plurality of TRPs or to a plurality of TRPs, or from one TRP or to one TRP.

When QCL is assumed, the following description should be considered.

Forward compatibility (for future introduction of additional interference management schemes, if any)

Low and high NR frequencies

Backhaul/fronthaul delay constraint

TDD and FDD

Data and control channels

Interference measurement/report

Interference control for modern receivers

Various scenarios

Beam management, different antenna structure, etc.

Intra/Inter-TRP CoMP for NR

In an NR environment, single/multi point transmission may be supported for both DL MIMO and UL MIMO. Further, in an NR environment, measurement assumption for QCL assumption and antenna ports may be performed. Hereinafter, intra/inter-TRP coordinated transmission in which QCL is assumed between particular RSs will be described based on the measurement assumption.

1. Intra-TRP Coordinated Transmission

Various antenna panel array structures are considered in the NR environment/system. A first panel model may be distinguished as a uniform 1D/2D rectangular panel array. Because a proper CSI-RS resource/port should be configured in the UE through such an antenna array, efficient closed-loop MIMO transmission may be applied based on CSI measurement and feedback of the UE. Because a CSI-RS port and antenna array mapping depend on eNB implementation, there may be various mapping methods, for example, there may be a method of mapping (1) one CSI-RS resource per panel, (2) a plurality of CSI-RS resources per panel, and (3) CSI-RS resources mapped to a plurality of panels.

Figure 11:
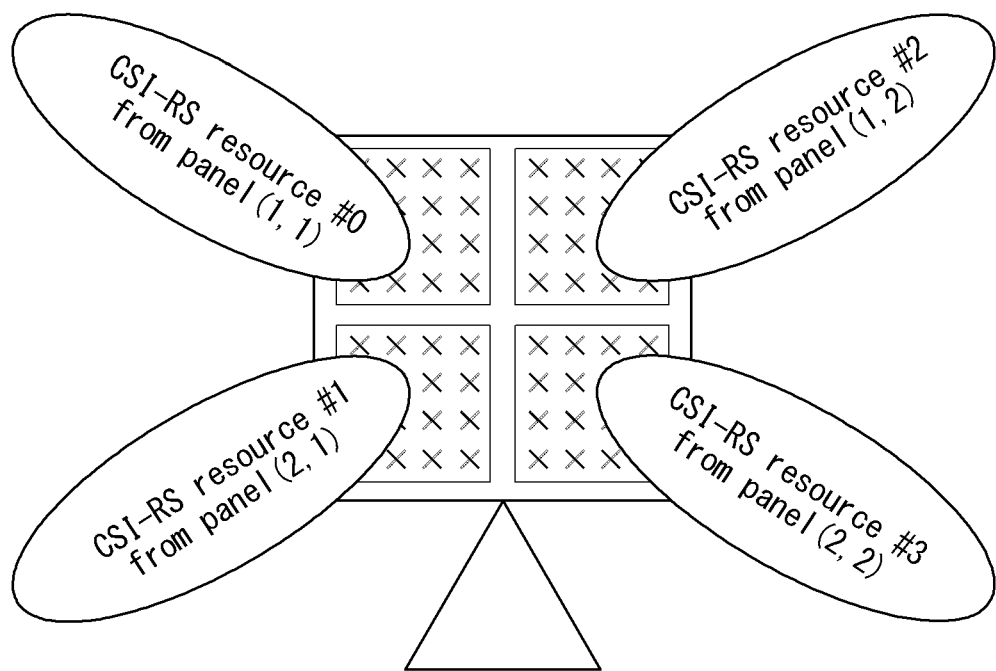
FIG. 11 illustrates a method of mapping one CSI-RS resource per panel according to an embodiment of the present invention.

FIG. 11 illustrates a method of mapping one CSI-RS resource per panel according to an embodiment of the present invention.

The embodiment of FIG. 11 represents a simplest method of CSI-RS mapping that enables CSI-RS ports in CSI-RS resources to be QCL guaranteed/assumed by transmitting one CSI-RS resource in (a/one) panel. That is, according to the present embodiment, QCL of at least some (e.g., average gain, delay spread, Doppler spread, Doppler shift, average delay, and/or receiving beam related parameters) of the above-described QCL parameters/characteristics between (some or all) CSI-RS ports in one CSI-RS resource may be assumed/guaranteed.

When the same oscillator (having a related component) is used for generating a signal in the CSI-RS ports (included in one CSI-RS resource or mapped to one panel), such QCL assumption/assurance may be performed.

This may be interpreted as a conventional single (virtual) cell operation, and by measuring an RS port corresponding to Radio Resource Management (for convenience, hereinafter, referred to as an 'RRM-RS'), a single virtual cell may be related to the UE. In order to support UE implementation according to a detailed RS design of the RRM-RS and potentially aperiodic/subband CSI-RS, a proper QCL assumption between the CSI-RS resource and a specific RRM-RS is required.

Figure 12:
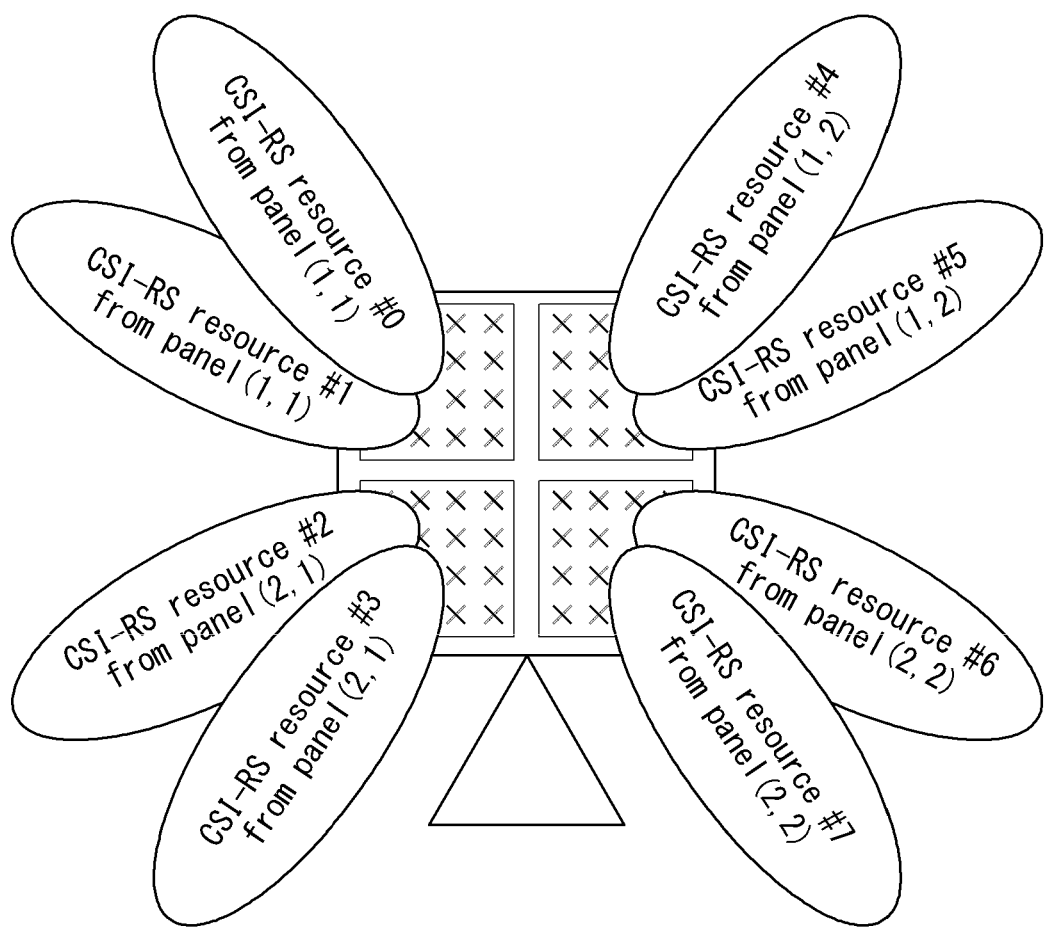
FIG. 12 illustrates a method of mapping a plurality of CSI-RS resources per panel according to an embodiment of the present invention.

FIG. 12 illustrates a method of mapping a plurality of CSI-RS resources per panel according to an embodiment of the present invention.

The embodiment of FIG. 12 may be interpreted as a multi-beamformed CSI-RS based operation similar to Full Dimension (FD)-MIMO class B having multiple Beamformed (BF) CSI-RS resources. Because these multiple CSI-RSs transmitted from a single panel target different beam directions, it may not be assumed that the multiple CSI-RSs are always QCL for all QCL characteristics/parameters between each CSI-RS and RRM-RS corresponding thereto. Similar to that defined in an LTE spec, in QCL assumption between a CSI-RS and an RRM-RS of this case, only some characteristics/parameters such as Doppler shift and Doppler spread may be used and this may be explicitly instructed. Because such a difference with the embodiment of FIG. 11 results from different CSI-RS mapping methods for an antenna array, an NR spec should properly support various implementations of CSI-RS antenna port mapping of different purposes.

Figure 13:
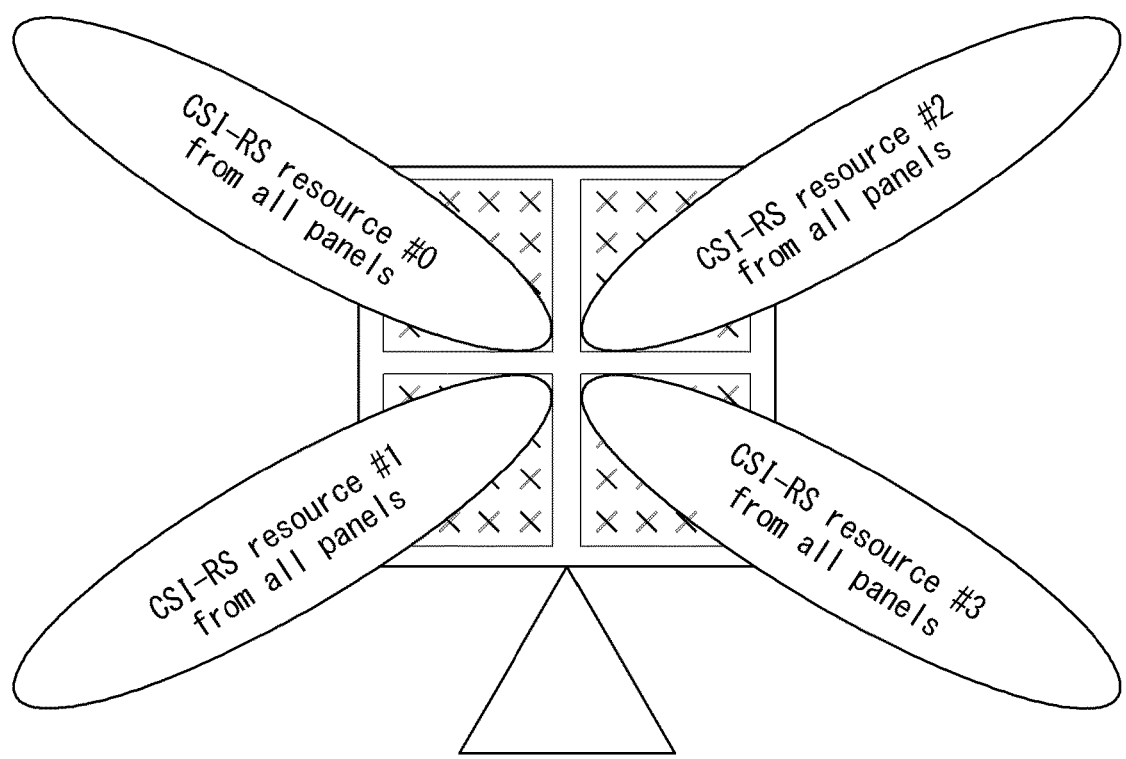
FIG. 13 illustrates a method of mapping shared CSI-RS resources to a plurality of panels according to an embodiment of the present invention.

FIG. 13 illustrates a method of mapping shared CSI-RS resources to a plurality of panels according to an embodiment of the present invention.

The embodiment of FIG. 13 may be interpreted as a shared CSI-RS resource mapped to multiple panels so that the CSI-RS transmitted by cooperative transmission from multiple panel antennas has a more beamforming gain. A method in which CSI-RS ports are mapped to the plurality of panels may be particularly useful, for example, when supporting SU-MIMO transmission to a specific UE having a low traffic load. When it is assumed that the network obtains sufficient information of a beamforming direction for a target UE, the CSI-RS may be used as a UE-specific beamformed CSI-RS dedicated to the UE. To properly support use scenarios, when QCL assumptions is necessary, it is necessary to research how QCL assumption and signaling between a CSI-RS and an RRM-RS are defined and supported for an NR operation.

According to the above description, various intra-TRP coordinated transmission methods may be considered in NR according to a CSI-RS resource mapping method of a multi-panel transmission point (TP). Further, proper QCL assumption between the RS(s) for RRM and the CSI-RS(s) set to the UE may be required to support intra-TRP coordinated transmission.

2. Inter-RS QCL and Inter-TRP Coordinated Transmission

In an RRM-RS design, in order to assist RRM-RS measurement, it should be considered whether QCL may be assumed in some (e.g., Doppler shift and average delay) of QCL parameters/characteristics obtained from synchronization signals for an RRM-RS. When the UE has once tracked such RRM-RS(s), it may be used for QCL linkage in a second level of the RRM-RS for finer beam refinement that may be beamformed UE-specifically to the UE. As described above, it is necessary that the CSI-RS is instructed to follow QCL linkage of a primary or secondary RRM-RS(s). When a subband CSI-RS is set to the UE, it may be advantageous to follow, for example, QCL of another CSI-RS transmitted in a broadband.

In a current LTE spec, the UE set to TM10 having a QCL type B may be scheduled to receive a PDSCH transmitted from a non-serving cell/TP as a CoMP dynamic point selection (DPS) operation. In this case, a DMRS for the PDSCH may be instructed to follow QCL with at least one of CSI-RSs set by a PQI field in DCI. In other words, the DMRS for the PDSCH may be set to have a QCL relation with at least one of CSI-RSs instructed by the PQI field. In such a DPS operation, an actual dynamic TRP selection is performed according to the preset CSI-RS resource (e.g., each CSI-RS resource set to each TRP) or a dynamic beam selection (DBS) may be performed in a single TRP and thus an operation similar to the DPS operation in NR-MIMO may be considered. This may be interpreted as intra-TRP CoMP from the beam adjustment viewpoint.

In order to properly support these kinds of various transmission strategies in NR, the DMRS for PDSCH should also be explicitly indicated to follow QCL to other RS, e.g., CSI-RS or RRM-RS, unless DMRS design for NR study is done without requiring any other QCL supports and by guaranteeing sufficient RS density within the scheduled band.

In particular, in order to support UE side phase compensation due to phase noise effect, a second level (i.e., secondary DMRS) of the DMRS may be transmitted with a scheduled PDSCH desiring to be spread over a time domain, as in several symbols of the same subcarrier. Because the second DMRS is an RS transmitted to support phase compensation of the UE side, the second DMRS may be a concept corresponding to the above-described PCRS (or PT-RS). Therefore, the second DMRS may be referred to as a PCRS (or PT-RS) or may be replaced by a PCRS (or PT-RS).

The second DMRS may be assumed to be QCL with the first DMRS for all QCL parameters/characteristics, where the QCL may be interpreted as the above-described GCL. Here, the GCL indicates that time/frequency bundling between the antenna ports is possible and is effectively the same port. As a result, the UE may assume the same precoding between GCL antenna ports to receive the DMRS.

In conclusion, to properly support various intra/inter-TRP coordinated transmissions, DMRS QCL to CSI-RS or RRM-RS may need to be dynamically indicated, unless DMRS design for NR is done without requiring any QCL supports and by guaranteeing sufficient RS density.

DPS/JT CoMP Through a Plurality of Intra/Inter-TRPs

Figure 14:
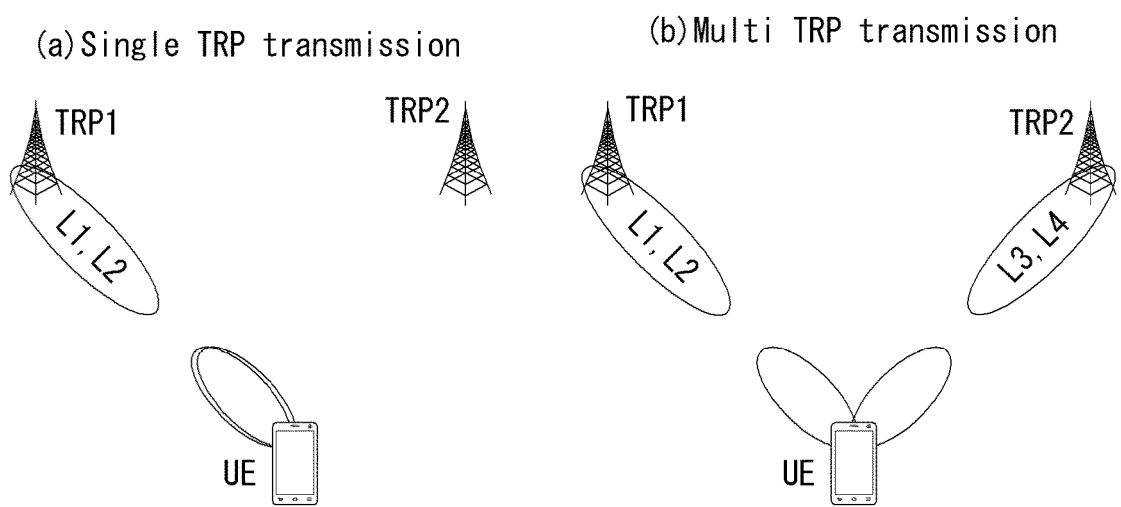
FIG. 14 is a diagram illustrating dynamic switching between one TRP transmission and a plurality of TRP transmissions according to an embodiment of the present invention.

FIG. 14 is a diagram illustrating dynamic switching between one TRP transmission and a plurality of TRP transmissions according to an embodiment of the present invention.

In particular, in the case of a high frequency band in NR, the number of dominant rays per TRP or a single panel may be limited as shown in FIG. 14 to be described later (e.g., maximum rank 2 is observed). FIG. 14 illustrates a case in which one single analog beamforming pair is assumed between the TRP and the UE and in which such beamforming pairs are independent when different TRPs are considered. For example, when it is assumed that the UE has four Rx antenna ports, there may be the following three different transmission schemes from the viewpoint of inter-beam interference management to be researched.

1. First scheme (single TRP transmission)—transmit from a serving TRP 1 to a rank 2

In this case, an Rx analog beam direction of all four Rx ports of the UE may be set to face the TRP 1, as shown in FIG. 14(a).

2. Second scheme (independent-layer JT from the TRP 1 and 2 (or may be referred to as non-coherent JT)—ranks are transmitted simultaneously from multiple TRPs (e.g., in the case of total rank 4 transmission, a rank 2 from the TRP 1 and another rank 2 from the TRP 2 are transmitted simultaneously)

In this case, as shown in FIG. 14(b), an Rx analog beam direction of the first 2 Rx ports of the UE may be set to face the TRP 1, and an independent Rx analog beam direction of the remaining 2 Rx ports of the UE may be set to face the TRP 2.

3. Third scheme (DPS between the TRP 1 and the TRP 2)—Rank 2 transmission from the serving TRP 1 or other cooperative TRP 2

In this case, an Rx analog beam direction of all 4 Rx ports of the UE may be set to face the TRP 1 or the TRP 2 according to an instruction of the eNB.

In order to achieve high SU-MIMO spectral efficiency, the above-described three distinct schemes need to be thoroughly verified, including dynamic switching. It is necessary to study how to configure the corresponding CSI-RS and CSI processes in consideration of various eNB implementation methods for mapping between a CSI-RS port and antenna array, as shown in FIGS. 11 to 13. When DL-related DCI instructs a transmission rank and an application scheme of the above-mentioned schemes, DCI decoding delay at the UE side may act as one big problem whenever analog beamforming is applied during a given time instance. This is because DCI transmission may be performed by the serving TRP 1, but actual data transmission may be performed by the TRP 2 (e.g., as in scheme 3).

Because such a TRP 1 and TRP 2 may be located in the same place, ideal backhaul between the TRP 1 and the TRP 2 may be assumed according to network implementation. Therefore, in order to increase the total applicable SU-MIMO rank per UE in NR, the cooperative transmission scheme between TRPs/panels as described above may have a high priority in NR-MIMO studies.

In conclusion, various intra-TRP cooperative transmission schemes may be considered in NR based on a CSI-RS resource mapping method of a multi-panel TP. Further, to properly support various intra/inter-TRP cooperative transmissions, DMRS QCL to CSI-RS or RRM-RS may need to be dynamically indicated, unless DMRS design for NR is done without requiring any QCL supports and by guaranteeing sufficient RS density. Therefore, in order to achieve at least high SU-MIMO spectral efficiency, inter-beam interference management schemes including DPS/JP CoMP through multiple intra-inter-TRPs should have a high NR-MIMO research priority.

Independent-Layer JT (Second Scheme)

Even in an environment of a mmW band, to improve connection reliability, improve load coupling between TRPs (or referred to as a 'base station'), and improve (SU) MIMO spectral efficiency, (independent-layer) JT method CoMP is estimated as an effective transmission method, which corresponds to the above-described second scheme in relation to FIG. 14(b).

Unlike the above-described DPS-based JT method in relation to FIGS. 9 and 10, the independent-layer JT method CoMP (i.e., the second scheme) has the difference in a JT method of using a plurality of (independent) Tx beams (i.e., Tx beam set) transmitted from a plurality of TRPs and a plurality of (independent) Rx beams (i.e., an Rx beam set) that receive the plurality of (independent) Tx beams. Therefore, the above description in relation to the embodiment of FIGS. 9 and 10 may be applied to the present embodiment in the same manner or the similar manner, and the difference will be mainly described below.

When the UE forms an Rx beam by analog beamforming and receives a signal from the base station, an optimal Rx beam direction of the UE is selected/determined according to whether the UE receives a signal transmitted by which TRP(s), as shown in FIG. 14. Therefore, it is necessary to notify in advance the UE of TRP(s) to transmit a signal, which conflicts with requirements for the transmission TRP dynamic change of an SF unit.

For such an operation, the UE may measure reference signal received power (RSRP) for a Beamformed Reference Signal (B-RS) in advance and report a plurality of strong beam directions to the base station based on the measurement result. For this, the TRP may send one B-RS to the UE for each Tx beam direction. That is, when the TRP transmits signals in the N number of Tx beam directions, the N number of B-RSs are transmitted, and the N number of Tx beam directions have a one-to-one mapping relationship with the N number of B-RSs. Here, the N number of B-RSs may be distinguished by allocating different port indices.

The UE may measure RSRP of B-RSs transmitted from a serving TRP and adjacent TRPs and report the RSRP measurement result of the plurality of strong B-RSs satisfying a predetermined condition to the base station. In this case, in order to measure RSRP of the B-RSs, the UE may determine an Rx beam for each B-RS.

When reporting the measured RSRP to the base station, the UE may report whether the RSRP is RSRP of which B-RS (i.e., which Tx beam) and/or is received through/using which Rx beam (e.g., reports Rx beam index information). That is, the UE may report (B-RS index, Rx beam index, and/or RSRP) of a plurality of strong B-RSs satisfying a predetermined condition to the base station. The base station may determine, through the reported Rx beam indices, whether the UE uses another Rx beam or the same Rx beam in order to receive another Tx beam. Further, as described hereinafter, by directly instructing information (i.e., beam index information) about the Rx beam indexes corresponding to each Tx beam (or Tx beam subset) instead of the Tx beam (or Tx beam subset) to the UE, the base station may actively support an (independent-layer) JT reception operation of the UE.

The base station may select a TRP to participate in data transmission for the corresponding UE and determine a Tx beam set of the selected TRP based on the reported RSRP. Here, beams constituting the Tx beam set (or included in the Tx beam set) may correspond to beams transmitted/formed in the same TRP and/or beams transmitted/formed in another TRP. The Tx beam set determined in this manner may be instructed directly or indirectly (or explicitly/implicitly) to the UE according to a method to be described hereinafter. Further, in the present embodiment, a plurality of Tx beams (beams corresponding to L1 to L4 in FIG. 14(b)) selected to be simultaneously transmitted within the Tx beam set determined in this manner may be defined/instructed as a 'Tx beam subset', and a plurality of Rx beams paired with such a Tx beam subset to be set to simultaneously receive each Tx beam may be defined/instructed as an 'Rx beam subset'.

Method 1-1) The base station may directly (or explicitly/implicitly) notify the UE of the Tx beam set through RRC signaling. In this case, the UE may determine/select an optimal Rx beam for each Tx beam included in the Tx beam set. That is, the UE may determine/select an Rx beam that may optimally receive a B-RS mapped (or transmitted through each Tx beam) to each Tx beam belonging to the Tx beam set instructed by the base station.

Method 1-2) The base station may set the CSI-RS mapped (or transmitted through each Tx beam) for each Tx beam belonging to the Tx beam set to the UE. That is, when there are the K number of Tx beams in the Tx beam set, the base station may notify the UE of the K number of CSI-RS configurations (or CSI-RS resources). The UE may determine an Rx beam that may be optimally received for each preset CSI-RS configuration/resource. Alternatively, the base station may set a beam refinement RS (BR-RS) mapped to each Tx beam belonging to the Tx beam set to the UE. The UE may determine an Rx beam that may be optimally received for each preset BR-RS.

In this case, the UE may report Rx beam index information on the determined Rx beam to the base station. In this case, by directly instructing information (i.e., beam index information) about Rx beam indexes (or beam index information) paired with/corresponding to each Tx beam (or Tx beam subset) instead of the Tx beam (or Tx beam subset) to the UE, the base station may actively support (independent-layer) JT reception operation of the UE.

A name of a reference signal used for determining an analog beam direction of the UE is not limited to the above-described BRS or BRRS, and may be replaced with/referred to as various reference signals usable for performing the same function. For example, the BRS may be replaced with/referred to as a primary/first CSI-RS, a primary synchronization signal/sequence (PSS), a secondary synchronization signal/sequence (SSS), a synchronization Signal/Sequence (SS) block, an NR-PSS, and/or an NR-SSS, and the BRRS may be replaced with/referred to as secondary/second CSI-RS.

By the above method, the base station Tx beam and the UE Rx beam may be paired. In order to enable the UE to receive (in real time) a signal with an optimal Rx beam (or optimal Rx beam subset), the following method for dynamically notifying switching of the Tx beam (or Tx beam subset) of the base station is proposed.

Method 2-1) A method of designating/instructing a PDSCH Tx beam (or Tx beam subset) with a PDCCH is proposed. That is, the base station designates/instructs an index(s) (and/or the same information as/information similar to the index(s), i.e., a B-RS port index(s), a CSI-RS configuration index/number(s), and/or a BR-RS port index(s) using the same Tx beam) of a beam to transmit the PDSCH to DCI transmitted through the PDCCH. When the B-RS port index(s) (and/or the CSI-RS configuration index(s)/number(s), BR-RS port index(s)) is(are) designated, the UE may receive the corresponding PDSCH through Rx beams (these Rx beams may be distinguished as an 'Rx beam subset') determined to use when receiving the designated B-RS port beams (and/or the CSI-RS, BR-RS port). According to this method, because an Rx beam (or the Rx beam subset) for receiving the PDSCH is determined through PDCCH decoding, a predetermined time gap (e.g., symbol level interval) is required between a PDSCH transmission end time point and a PDSCH transmission start time point. Such time gap related information may be defined/set in advance or may be dynamically changed/updated by L1 and/or L2 signaling and the like. As a result, the UE may complete DCI decoding for a time gap to determine an optimal Rx beam (or optimal Rx beam subset) and receive the PDSCH using the optimal Rx beam.

In the proposed method, a configuration of the Rx beam (or Rx beam subset) of the UE for PDCCH reception may follow the following methods.

2-1-1) The PDCCH may be transmitted with a fixed Tx beam of a fixed TRP. That is, a serving Tx beam that transmits in advance the PDCCH may be designated. For example, the PDCCH may be transmitted with a specific Tx beam (e.g., first Tx beam) in a Tx beam set (or Tx beam subset). In this case, the UE may receive the PDCCH with the Rx beam paired with the designated Tx beam.

For example, when the present embodiment is applied to the case of FIG. 14(b), in order to receive the PDCCH, the UE may set all ports (e.g., 4 Rx ports) thereof in a designated Tx beam direction (TRP 1 direction when the designated Tx beam is transmitted from the TRP 1). According to this example, because the UE uses all ports for PDCCH reception, the effect of improving a reception performance of the PDCCH occurs.

2-1-2) The PDCCH may be received in the UE with a wide Rx beam. And/or, in order to receive all signals transmitted in a direction of the Rx beams paired with the Tx beams belonging to the Tx beam set, the UE may form a multi-beam to receive the PDCCH.

2-1-3) In case of having a plurality of Rx antenna ports, the UE may receive a signal by changing an Rx beam (or Rx beam direction) for each Rx antenna port during a PDCCH reception period. For example, when the UE has two Rx antenna ports and there are two Tx beams in the Tx beam set (or Tx beam subset), the UE may receive signals using an Rx beam 1 (or Rx Beam 1 of a first direction) paired with a Tx beam 1 in an Rx antenna port 1 and receive signals using an Rx beam 2 (or Rx beam 2 of a second direction) paired with a Tx beam 2 in an Rx port 2.

Method 2-2) According to this method, an operation of dividing SF sets and determining a (DL) Tx beam (and/or Tx beam subset) and an Rx beam (and/or a Rx beam subset) corresponding to/paired with the (DL) Tx beam (and/or Tx beam subset) according to the divided SF (or based on the SF set) may be proposed. For example, the SF may be divided into an even-numbered SF set and an odd-numbered SF set, in the even-numbered SF set, a PDCCH and a PDSCH may be determined to be transmitted through a Tx beam 1, and in the odd-numbered SF set, a PDCCH and a PDSCH may be determined to be JT transmitted through a Tx beam 1 and a Tx beam 2 (i.e., a Tx beam subset). Therefore, the UE may receive signals with the received Rx Beam 1 paired with the Tx Beam 1 in the even-numbered SF set and receive signals (by separating Rx port groups on a Tx beam basis) with the Rx Beam 1 and the Rx Beam 2 (i.e., Rx beam subset mapped to a Tx beam subset) paired with each of the Tx Beam 1 and the Tx Beam 2 in the odd-numbered SF set.

In summary, when SFs are divided into a plurality of SF sets according to a predetermined criterion, each divided SF set may be mapped to a specific Tx beam (or Tx beam subset), and a Tx beam (or a Tx beam subset) mapped for each SF set may be transmitted. Further, the Rx beam (or Rx beam subset) transmitted in the corresponding SF set based on the Tx beam (or Tx beam subset) mapped to the SF set may also be determined (e.g., determined to an Rx beam (or Rx beam subset) mapped to the corresponding Tx beam (or Tx beam subset)).

2-2-1) To maintain and use the Tx beam (or Tx beam subset) selected in the proposed method 2-2 for a predetermined time period, the same Tx beam (or Tx beam sub-Set) may be used in PDCCH and PDSCH transmission in continuous SFs. That is, when the PDCCH and the PDSCH are transmitted in a burst form in the continuous SFs, the Tx beam (or Tx beam subset) may be determined based on an SF set to which a first SF of the burst belongs (e.g., determine to the same Tx beam (or Tx beam subset) as that transmitted in the first SF). In this method, when the PDCCH and the PDSCH have been transmitted to a corresponding UE in a previous SF (e.g., first SF), the UE may assume that the same Tx beam (or Tx beam subset) as that used in the previous SF (e.g., the first SF) has been used even in a current SF and receive signals using an Rx beam (or Rx beam subset) paired (respectively) with the corresponding Tx beam (or Tx beam subset). Therefore, in order to change the Tx beam (or Tx beam subset) in the proposed method, during a particular SF period (e.g., during one SF), data/signal transmission to the UE may be stopped.

Method 2-3) According to this method, the base station may instruct in advance to the UE with DCI whether the TRP (or TRP set, where the TRP set represents a set including a plurality of TRPs simultaneously transmitting the Tx beam subset) is changed. The base station may notify the Tx beam (or Tx beam subset) to transmit the PDCCH and the PDSCH at a specific time point (e.g., from some future SF) through DCI transmitted through the PDCCH. That is, the Tx beam (or Tx beam subset) instructed to the UE in the n-th SF may be applied/used from the (n+k) th SF. And/or, SFs may be divided into groups, for example, SFs for 10 ms may be grouped into one group, and a Tx beam (or Tx beam subset) to be used in a next SF group may be instructed in the corresponding SF group.

2-3-1) In the proposed method, when DCI including a Tx beam (or Tx beam subset) indication is not successfully decoded, the UE may not properly set an Rx beam (or Rx beam subset) for receiving a next PDCCH and thus a continuous DCI reception error may occur. To mitigate this, it is possible to designate a fallback SF at a predetermined SF interval, and in the fallback SF, the PDCCH and the PDSCH may be transmitted only through a serving Tx beam. Therefore, the UE may receive the signal with the Rx beam paired with the serving Tx beam in a fallback SF of a predetermined SF interval.

In the above proposed methods, the PDSCH and the PDCCH carrying scheduling DCI of the PDSCH may be i) transmitted by the same Tx beam (or Tx beam subset) in the same TRP (or TRP set) or ii) transmitted by another Tx beam (or Tx beam subset). After receiving the PDSCH, the UE may report to the base station through the PUCCH whether (or HARQ ACK/NACK feedback information) decoding of the corresponding PDSCH (or DCI transmitted through the corresponding PDSCH) is successful. In this case, the Tx beam (or Tx beam set) used by the UE for PUCCH transmission may be determined through the following method.

Method 3-1) an Rx beam of the UE paired with a Tx beam of a specific TRP designated by RRC signaling is used as an UE Tx beam for PUCCH transmission Method 3-2) An Rx beam (or Rx beam subset) of the UE paired with the Tx beam (or Tx beam subset) of the TRP (or TRP set) designated/instructed in scheduling DCI of the PDSCH is used as an UE Tx beam (or Tx beam set) for PUCCH transmission Method 3-3) An Rx beam (or Rx beam subset) of the UE used for receiving scheduling DCI of the PDSCH is used as an UE Tx beam (or Tx beam set) for PUCCH transmission. In this case, PUCCH transmission of the UE may be interpreted to a UL JT transmission method from the UL CoMP viewpoint.

Method 3-4) An Rx beam (or Rx beam subset) of the UE used for receiving the PDSCH is used as an UE Tx beam (or Tx beam set) for PUCCH transmission.

A brief summary of the above description is as follows:

1. Motive

A mmW environment is an environment difficult to derive a transmission rank of 2 or more with single analog beamforming between the TRP and the UE.

When the UE has 4 receiving antenna ports:

Case 1 (first scheme): rank 2 transmission of a single TRP, and in this case, the UE sets an analog beam direction of all receiving antenna ports to face the corresponding TRP.

Case 2 (second scheme): rank 4 transmission by cooperation of two TRPs (TRP 1 and TRP 2), and in this case, the UE sets an analog beam direction so that two antenna ports have a TRP 1 direction and the other two antenna ports have a TRP 2 direction.

Necessity of dynamic switching between the case 1 and the case 2: accordingly, a detailed definition of a CSI-RS configuration and a CSI feedback method and/or a signaling method through DCI is required. However, when switching a case (or scheme) while notifying a transmission rank with DCI, there is a problem of PDCCH decoding delay.

2. Suggestions

Method 1) Setting a Time Gap Between a PDCCH and a PDSCH

As described above, because an Rx beam (or Rx beam subset) for receiving the PDSCH is determined through decoding of the PDCCH, a predetermined time gap (e.g., symbol level interval) between a PDCCH transmission end point and a PDSCH transmission start point for securing a PDCCH decoding time is required.

For example, in an example of FIG. 14(b), when the PDCCH is transmitted using a rank 2 (L1, L2) of the TRP 1 and the PDSCH is transmitted using a rank 4 (L1 to L4) of the TRP 1 and the TRP 2, it is necessary to set a time gap between the PDCCH and the PDSCH (particularly, the PDSCH transmitted using a rank 2 (L3 and L4) of the TRP 2).

Such time gap related information may be defined/set in advance or may be dynamically changed/updated by L1 and/or L2 signaling and the like. As a result, the UE may complete DCI decoding during a time gap to determine an optimal Rx beam and to receive the PDSCH using the optimal Rx beam. Further, the above-described time gap configuration related embodiment may be applied to the present embodiment in the same manner or similar manner.

In this case, the TRP may explicitly/implicitly notify the UE (via PDCCH) of a beam set index (BSI) (referred to as 'beam index information') for each layer group for receiving data transmitted independently for each layer group.

Here, the layer group means a group in which at least one layer is grouped according to a predetermined criterion/condition. Such a layer group may be explicitly instructed by signaling or a criterion for distinguishing a layer group may be separately defined/set (in a higher layer). For example, the layer group may be grouped based on the TRP (and/or transmitted beam direction) to which the layer is transmitted (or corresponding), and in an embodiment described with reference to FIG. 14(b), layer groups may be divided into a first layer group including L1 and L2 of the TRP 1 and a second layer group including L3 and L4 of the TRP 2. BSI instructed for each layer group may be paired with the UE Rx beam (or Rx beam set).

The BSI is a parameter used for explicitly/implicitly indicating beam related information for reception of a transmission signal for each layer group and may be referred to as a 'spatial Rx parameter'. For example, the BSI may correspond to a parameter/indicator used for instructing or deriving i) (most) effective/dominant beam/spatial receiving direction/angle related information, and/or ii) receiving beam/space/angle spectrum/range information on how much a beam direction is spread by reflector distribution about/based on the effective/dominant beam/space. Such BSI may be used for QCL assumption for a receiving beam/space/angle operation function, as described below.

For this, the TRP (TRP1 in an example of FIG. 14(b)) may instruct the number of total ranks used for data packet transmission through scheduling grant DCI, BSI corresponding to each of the divided layer (or rank) groups, and/or a scheduling parameter set (e.g., DMRS configuration parameter, scrambling seed parameter, data rate matching information, and/or information to apply QCL assumption) to be applied to each layer group to the UE.

Method 2) the UE activates (in advance) simultaneous PDSCH transmittability in the TRP 1 and the TRP 2 and sets to separate beam directions of a receiving antenna while simultaneous PDSCH transmittability is activated.

That is, according to the method 2, the UE may instruct in advance to activate a reception function of a PDSCH to simultaneously transmit (i.e., JT) from a plurality of TRPs, and may separate an Rx beam direction of the antenna while a corresponding function is activated to simultaneously receive a PDSCH from different TRPs.

Activation (and/or reactivation, deactivation) of such an UE function may be instructed/provided by semi-static signaling (e.g., signaling by RRC) and more dynamically instructed/provided by L1 (e.g., by DCI) and/or L2 (e.g., by a medium access control (MAC) control element (CE)) signaling.

The UE, having received (re-)activation signaling applies/performs an activation operation (i.e., separate a beam direction of a receiving antenna) after a particular defined/set time (e.g., k SF(s), where k is a natural number)(from an SF received the corresponding signaling), thereby starting an (independent-layer) JT reception operation. When receiving specific deactivation/release signaling, the UE releases/stops an activation operation after a particular defined/set time (e.g., k' SF(s), where k' is a natural number) (from an SF received the corresponding signaling) and follows an operation and/or a default operation (e.g., set an Rx beam of the UE and receive a signal/data based on a single serving Tx beam) performed/applied prior to activation.

and/or, method 2a) may be implicitly (re-) activated dependent on/interlocking with a rank reported by the UE According to the method 2a, "simultaneous PDSCH transmittability is (re-)activated in a plurality of TRPs (e.g., TRP 1 and TRP 2)" dependent on/interlocking with/based on a CSI content (e.g., RI) value in which the UE reports to the base station, and while simultaneous PDSCH transmittability is (re-)activated, the UE may define/set an operation to separate a beam direction of the receiving antenna.

For example, when the UE reports a rank to X (e.g., X=1 or 2), the UE may prepare/perform a receiving operation according to at least one of the first scheme (receive data/signal with an Rx beam paired with one serving Tx beam) and the third scheme (DPS method) (until a rank higher than X is reported). When the UE reports the rank X to Y (e.g., Y=3) or more, the UE may prepare/perform a receiving operation according to the second scheme ((independent-layer) JT) (until a rank lower than Y is reported). That is, when an RI indicating the predetermined number of ranks or more is reported, (independent-layer) JT transmission of data/signal from a plurality of TRPs may be determined, and the UE may predict this to prepare/perform data/signal reception. Even in this case, as in an activation signaling reception embodiment, the UE may report RI (i.e., from the SF reporting RI) and separate Rx beam directions of the antenna after a predetermined time (e.g., predetermined SF) to simultaneously receive the PDSCH from different TRPs.

Method 3) Division According to SF Set

As described above in relation to the method 2-2, the UE may perform an operation of determining a Tx beam (and/or Tx beam subset) and an Rx beam (and/or Rx beam subset) corresponding to/paired with the Tx beam (and/or Tx beam subset) according to the divided SF set. For such an operation (and/or for JT CoMP related specific/some operations proposed in the present specification), the UE may notify (in advance) the base station of capability information thereof.

For example, the UE may notify the base station of capability information (e.g., information on whether a second scheme may be supported, if a second scheme may be supported, which number of layer-groups may be supported, and/or the number of DMRS ports that may be set in each layer-group) such as whether signal/data reception is available with a Rx beam subset through separated/divided Rx port groups. The base station may provide various configurations (e.g., Tx beam (and/or Tx beam subset) configuration per divided SF set and/or configuration for performing the proposed method) to the UE based on the information.

Method 4) The base station may notify in advance the UE whether the (next) TRP is changed using (separate) DCI, as described above in relation to the method 2-3.

3. Considerations

B-RS report:

i) The UE reports a plurality of strong/robust beam directions to the base station, ii) The UE reports RSRP in the form of (TRP Tx Beam ID, UE Rx Beam ID)

CSI-RS configuration:

i) Alt 1) One merged CSI-RS configuration: a port-group selection codebook is required ii) Alt 2) CSI-RS configuration per TRP: i) multiple CSI process configuration, ii) single CSI process based on sum rank concept (Non coherent JT)

iii) Alt 3) CSI-RS configuration in which the above Alt 1) and Alt 2) are combined CSI-RS report: i) one CSI report, ii) multiple CSI reports, iii) selected CSI report of the UE PDCCH transmission TRP (may be represented with BSI and/or specific analog beam (pair) index(s)):

i) Only a primary TRP (e.g., TRP 1) may transmit a PDCCH (the same as that described above in relation to the method 2-1-1), (when applying to the example of FIG. 14(b), the UE may set all 4-ports in a TRP 1 direction during PDCCH reception, and in this case, reception performance enhancement effect occurs)

ii) TRP 1 and 2 simultaneously transmit a PDCCH (this is similar to dual connectivity)

DCI related details

Figure 15:
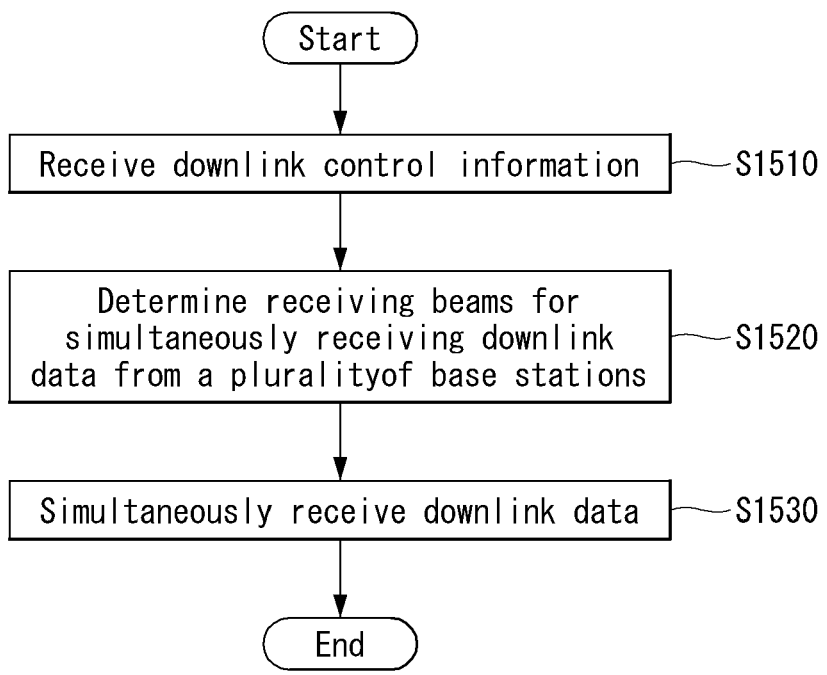
FIG. 15 is a flowchart illustrating a method of transmitting data of a UE according to an embodiment of the present invention.

ACK/NACK Feedback:

i) Encoded jointly with one PUCCH and transmitted (a PUCCH transmission beam direction may be set with a primary TRP)

ii) Encoding (similar to dual connectivity) separated from a plurality of PUCCHs FIG. 15 is a flowchart illustrating a method of transmitting data of a UE according to an embodiment of the present invention. The above-described embodiments may be equally or similarly applied in relation to the flowchart and duplicate descriptions are omitted.

First, the UE may receive downlink control information related to downlink data transmission from at least one base station (S1510). The downlink control information may be transmitted from a predetermined one (e.g., serving base station) of a plurality of base stations or a plurality of base stations (independent-layer) JT transmitting downlink data.

Next, the UE may determine receiving beams (or receiving beam subset) for simultaneously receiving downlink data independently transmitted through a plurality of layer groups from a plurality of base stations including the at least one base station based on the downlink control information (S1520). Here, each of the plurality of layer groups may be mapped to different base stations according to an embodiment and may be configured to include at least one layer.

Next, the UE may simultaneously receive downlink data from the plurality of base stations using the determined receiving beams (S1530).

In the present embodiment, the downlink control information may include beam index information about receiving beams used for determining receiving beams, and the beam index information may be instructed for each of the plurality of layer groups. Here, the beam index information may be information indicating a receiving beam direction, a receiving beam angle, and/or a receiving beam spectrum of the downlink data. Further, the downlink control information may further include information about the number of total ranks used for downlink transmission, a DMRS configuration parameter applied to each of a plurality of layer groups, a scrambling seed parameter, data rate matching information, and/or quasi co-located (QCL) assumption.

Further, a predetermined time gap may be set between a transmission time point of downlink control information and a transmission time point of downlink data. The predetermined time gap at this time may be set to the UE at a specific time or may be dynamically instructed to the UE by L1 and/or L2 signaling. Further, the predetermined time gap may be set in a symbol unit.

Although not shown in the flowchart, the UE may previously receive instruction information notifying simultaneous transmission of downlink data from a plurality of base stations. In this case, step S1530 of simultaneously receiving the downlink data may be performed after a predetermined subframe from a subframe that receives the instruction information. The instruction information may be semi-statically instructed to the UE through RRC signaling or dynamically instructed to the UE by L1 and/or L2 signaling.

Whether downlink data are simultaneously transmitted may be determined by linking (or based on) with a CSI content (e.g., RI) reported by the UE to the base station that transmits the downlink control information. For example, when RI reported by the UE to the base station instructs the predetermined rank number or more, simultaneous transmission of downlink data may be determined. In this case, step S1530 of simultaneously receiving the downlink data may be performed after a predetermined subframe from a subframe that reports the RI.

System to which the Present Invention May be Applied

Figure 16:
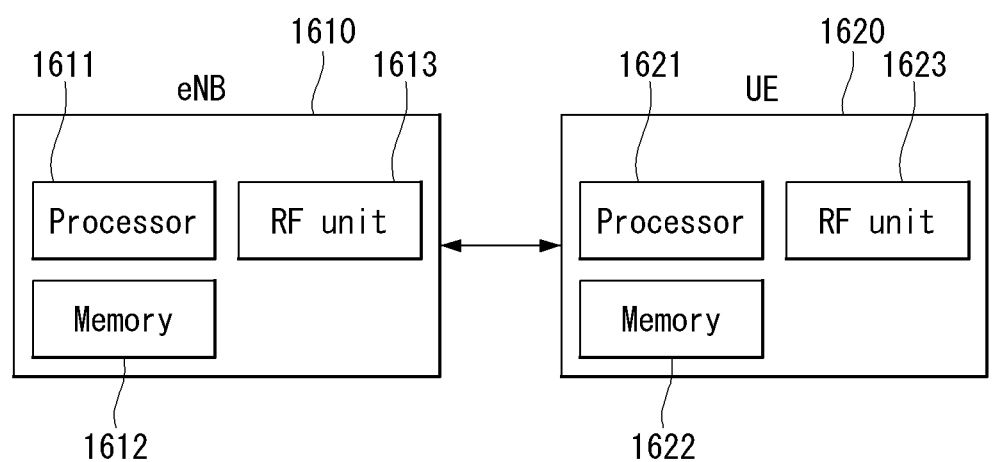
FIG. 16 is a block diagram illustrating a configuration of a wireless communication device according to an embodiment of the present invention.

FIG. 16 is a block diagram illustrating a configuration of a wireless communication device according to an embodiment of the present invention.

Referring to FIG. 16, a wireless communication system includes an eNB 1610 and a plurality of UEs 1620 located in an eNB 1610 region.

The eNB 1610 includes a processor 1611, a memory 1612, and a radio frequency unit (RF unit) 1613. The processor 1611 implements a function, a process, and/or a method suggested in FIGS. 1 to 14. Layers of a wireless interface protocol may be implemented by the processor 1611. The memory 1612 is connected to the processor 1611 to store various information for driving the processor 1611. The RF unit 1613 is connected to the processor 1611 to transmit and/or receive a radio signal.

The UE 1620 includes a processor 1621, a memory 1622, and an RF unit 1623. The processor 1621 implements a function, process, and/or method suggested in the above-described embodiments. Layers of a wireless interface protocol may be implemented by the processor 1621. The memory 1622 is connected to the processor 1621 to store various information for driving the processor 1621. The RF unit 1623 is connected to the processor 1621 to transmit and/or receive a radio signal.

The memories 1612 and 1622 may exist at the inside or the outside of the processors 1611 and 1621 and may be connected to the processors 1611 and 1621, respectively, by well-known various means. Further, the eNB 1610 and/or the UE 1620 may have a single antenna or a multiple antenna.

In the aforementioned embodiments, the elements and characteristics of the present invention have been combined in specific forms. Each of the elements or characteristics should be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of operations described the embodiments of the present invention may be changed. Some of the elements or characteristics of an embodiment may be included in another embodiment or may be replaced with corresponding elements or characteristics of another embodiment. It is evident that an embodiment may be configured by combining claims not having an explicit citation relation in the claims or may be included as a new claim by amendments after filing an application.

The embodiment of the present invention may be implemented by various means, for example, hardware, firmware, software, or a combination thereof. In the case of implementations by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, and microprocessors.

In the case of an implementation by firmware or software, the embodiment of the present invention may be implemented in the form of a module, procedure, or function for performing the aforementioned functions or operations. A software code may be stored in the memory and driven by the processor. The memory may be located inside or outside the processor and may exchange data with the processor by a variety of known means.

It is evident to those skilled in the art that the present invention may be materialized in other specific forms without departing from essential characteristics thereof. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

In the present invention, an example applied to a 3GPP LTE/LTE-A system has been mainly described, but the present invention can be applied to various wireless communication systems in addition to a 3GPP LTE/LTE-A system.

The invention claimed is:

1. A method in which a user equipment (UE) receives data in a wireless communication system, the method comprising:
receiving downlink control information related to downlink data transmission from at least one base station;
determining receiving beams for simultaneously receiving the downlink data transmitted independently through a plurality of layer groups from a plurality of base stations comprising the at least one base station based on the downlink control information; and
simultaneously receiving the downlink data from the plurality of base stations using the determined receiving beams,
wherein the downlink control information comprises beam index information about the receiving beams, and
wherein the beam index information is instructed for each of the plurality of layer groups.

2. The method of claim 1, wherein the downlink control information is transmitted from a predetermined one of the plurality of base stations or the plurality of base stations.

3. The method of claim 2, wherein the downlink control information further comprises information about the number of total ranks used for the downlink data transmission, a demodulation reference signal (DMRS) configuration parameter applied to each of the plurality of layer groups, a scrambling seed parameter, data rate matching information, and/or quasi co-located (QCL) assumption.

4. The method of claim 2, wherein a predetermined time gap is set between a transmission time point of the downlink control information and a transmission time point of the downlink data.

5. The method of claim 4, wherein the predetermined time gap is set to the UE at a specific time or is dynamically instructed to the UE by Layer 1 (L1) and/or Layer 2 (L2) signaling.

6. The method of claim 4, wherein the predetermined time gap is set in a symbol unit.

7. The method of claim 1, further comprising receiving instruction information notifying simultaneous transmission of the downlink data from the plurality of base stations.

8. The method of claim 7, wherein the simultaneously receiving of the downlink data is performed after a predetermined subframe from a subframe that receives the instruction information.

9. The method of claim 7, wherein the instruction information is semi-statically instructed to the UE through radio resource control (RRC) signaling or is dynamically instructed to the UE by L1 and/or L2 signaling.

10. The method of claim 1, wherein whether the downlink data are simultaneously transmitted is determined based on a rank indicator (RI) reported by the UE to the at least one base station.

11. The method of claim 10, wherein simultaneous transmission of the downlink data is determined when the RI instructs the predetermined rank number or more.

12. The method of claim 10, wherein the simultaneously receiving of the downlink data is performed after a predetermined subframe from a subframe that reports the RI.

13. The method of claim 1, wherein each of the plurality of layer groups is mapped to different base stations and comprises at least one layer.

14. The method of claim 1, wherein the beam index information instructs a receiving beam direction, a receiving beam angle, and/or a receiving beam spectrum of the downlink data.

15. A user equipment (UE) for receiving data in a wireless communication system, the UE comprising:

a radio frequency (RF) unit for transmitting and receiving a radio signal; and a processor for controlling the RF unit, wherein the processor is configured to:

receive downlink control information related to downlink data transmission from at least one base station;

determine receiving beams for simultaneously receiving the downlink data transmitted independently through a plurality of layer groups from a plurality of base stations comprising the at least one base station based on the downlink control information; and simultaneously receive the downlink data from the plurality of base stations using the determined receiving beams, wherein the downlink control information comprises beam index information about the receiving beams, and wherein the beam index information is instructed for each of the plurality of layer groups.

* * * * *